United States Patent
Alexander et al.

(10) Patent No.: US 11,614,062 B2
(45) Date of Patent: Mar. 28, 2023

(54) ENGINE STARTING SYSTEM

(71) Applicant: FNA Group, Inc., Pleasant Prairie, WI (US)

(72) Inventors: Gus Alexander, Inverness, IL (US); Chris Alexander, Park Ridge, IL (US); Richard J. Gilpatrick, Burlington, WI (US); Joshua Skrzypchak, Pleasant Prairie, WI (US); Shawn M. Mulkins, Zion, IL (US); Robert E. Dowd, Oconomowoc, WI (US)

(73) Assignee: FNA Group, Inc., Pleasant Prairie, WI (US)

( * ) Notice: Subject to any disclaimer, the term of this patent is extended or adjusted under 35 U.S.C. 154(b) by 0 days.

(21) Appl. No.: 17/189,597

(22) Filed: Mar. 2, 2021

(65) Prior Publication Data

US 2021/0270224 A1 Sep. 2, 2021

Related U.S. Application Data

(60) Provisional application No. 62/983,889, filed on Mar. 2, 2020.

(51) Int. Cl.
| | |
|---|---|
| *F02N 11/00* | (2006.01) |
| *F02N 11/08* | (2006.01) |
| *B60K 17/28* | (2006.01) |
| *F02B 65/00* | (2006.01) |
| *B60K 17/06* | (2006.01) |

(52) U.S. Cl.
CPC ......... *F02N 11/0862* (2013.01); *B60K 17/06* (2013.01); *B60K 17/28* (2013.01); *F02B 65/00* (2013.01); *F02N 11/0851* (2013.01)

(58) Field of Classification Search
CPC .......... F04B 49/02; F04B 1/128; F04B 1/146; F04B 1/122; F04B 17/05; F04B 53/14; F04B 53/00; B08B 3/026; B08B 3/02; B08B 2203/0241; B08B 2203/027; F02N 11/0862; F02N 11/0851; F02B 65/00; B60K 17/06; B60K 17/28
See application file for complete search history.

(56) References Cited

U.S. PATENT DOCUMENTS

| | | | | |
|---|---|---|---|---|
| 5,309,778 | A * | 5/1994 | Antonov | B60K 6/26 74/15.86 |
| 7,152,403 | B2 * | 12/2006 | Yoshida | B62M 19/00 60/494 |
| 7,574,988 | B1 * | 8/2009 | Fiorenza | F02N 5/00 123/185.14 |
| D823,900 | S * | 7/2018 | Alexander | D15/7 |
| 2003/0035734 | A1 * | 2/2003 | Vukovich | F16H 61/0025 417/374 |
| 2011/0315176 | A1 * | 12/2011 | Gilpatrick | B08B 3/026 134/57 R |

(Continued)

*Primary Examiner* — Sizo B Vilakazi
*Assistant Examiner* — Sherman D Manley
(74) *Attorney, Agent, or Firm* — Brian J. Colandreo; Jeffery T. Placker; Holland & Knight LLP

(57) ABSTRACT

An electric starting system is provided for an engine. The electric starting system may include a self-contained housing configured to be mounted between an engine and a tool driven by the engine. The electric starting system may also include an electric motor mounted to the housing, the electric motor configured rotationally engage an output shaft of the engine to effectuate starting of the engine.

18 Claims, 33 Drawing Sheets

(56) References Cited

U.S. PATENT DOCUMENTS

| | | | | |
|---|---|---|---|---|
| 2012/0248773 | A1* | 10/2012 | Whinnery | F02N 11/0866 |
| | | | | 290/46 |
| 2013/0175105 | A1* | 7/2013 | Gallazzini | B60K 17/28 |
| | | | | 180/170 |
| 2015/0225027 | A1* | 8/2015 | Ertel | F16D 11/14 |
| | | | | 180/53.7 |
| 2016/0195170 | A1* | 7/2016 | Sugano | F16H 63/18 |
| | | | | 74/335 |
| 2017/0204829 | A1* | 7/2017 | Hannah | F02N 5/04 |
| 2017/0248196 | A1* | 8/2017 | Turner | F02N 15/022 |
| 2017/0350386 | A1* | 12/2017 | Alexander | F04B 1/128 |
| 2018/0058411 | A1* | 3/2018 | Archer | F16D 43/14 |
| 2018/0100564 | A1* | 4/2018 | Fliearman | F16H 3/54 |
| 2019/0289771 | A1* | 9/2019 | Lang | A01B 71/06 |
| 2020/0332868 | A1* | 10/2020 | Fliearman | F02N 11/14 |

\* cited by examiner

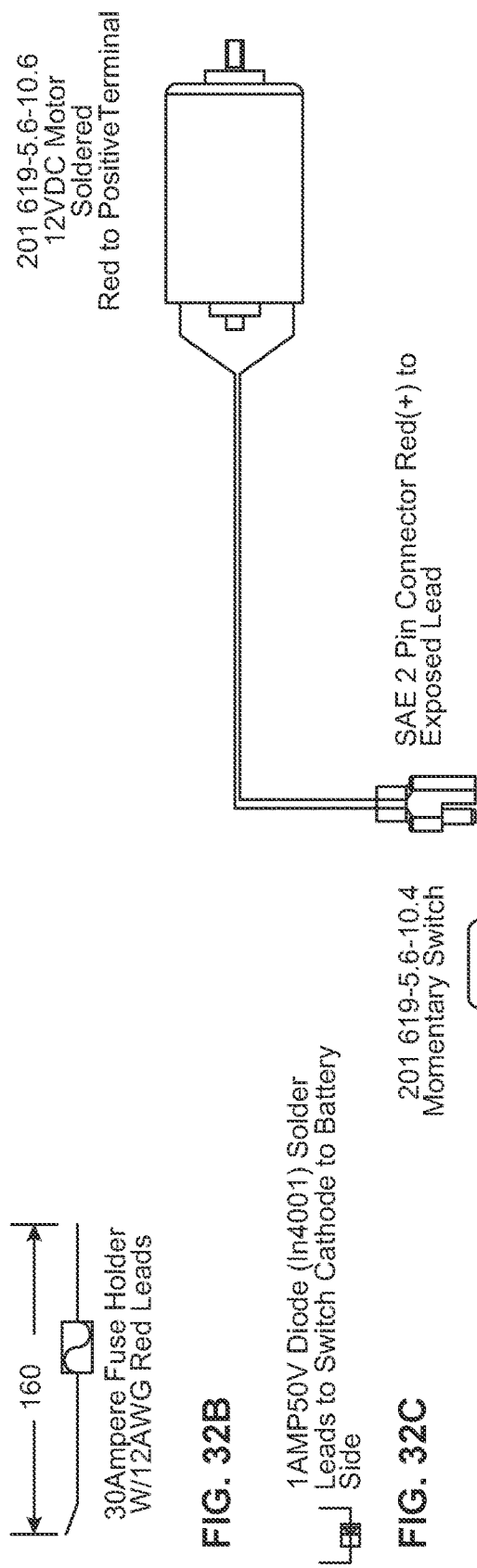
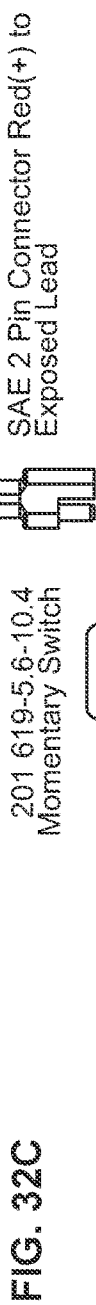
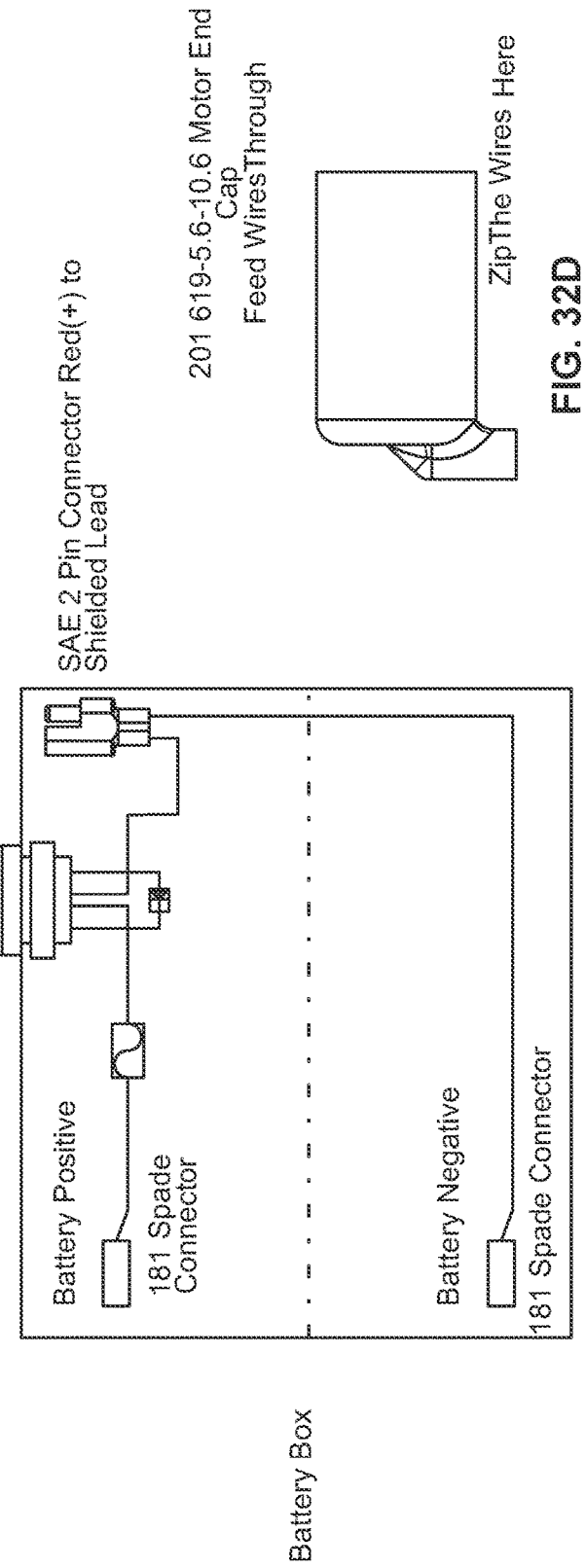
FIG. 32B
FIG. 32C
FIG. 32A
FIG. 32D

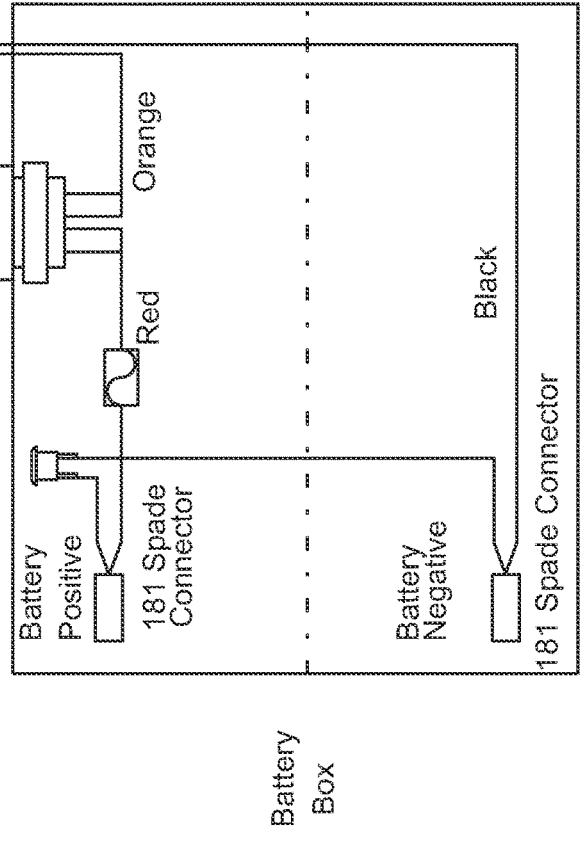
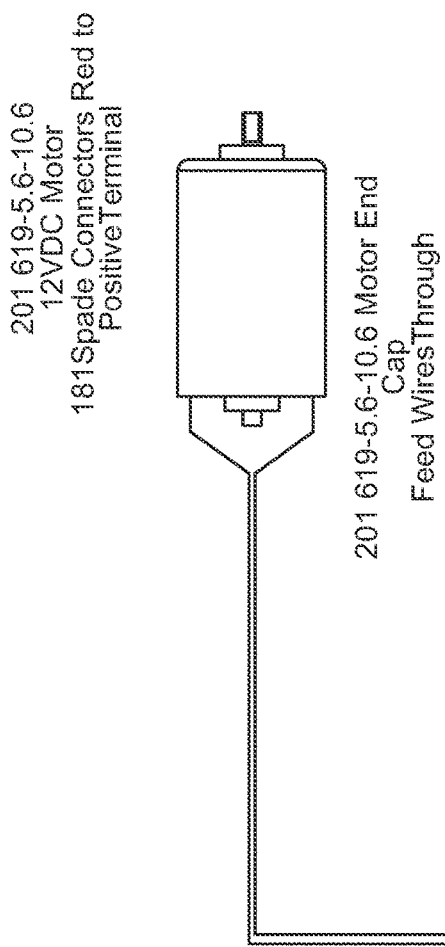
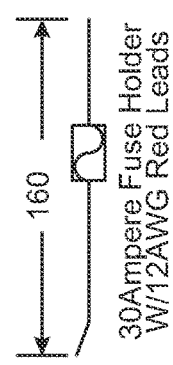

ENGINE STARTING SYSTEM

CROSS-REFERENCE TO RELATED APPLICATION

This application claims the benefit of U.S. provisional application Ser. No. 62/983,889, entitled "ENGINE STARTING SYSTEM," and filed on Mar. 2, 2020, the entire disclosure of which is incorporated herein by reference.

TECHNICAL FIELD

In general, the present disclosure may relate to power equipment powered by an internal combustion engine.

BACKGROUND

Many domestic and commercial water usage applications may require relatively high pressures, which may be beyond the capacity of residential and/or municipal water distribution and supply systems. For example, heavy duty cleaning applications may benefit from increased spraying pressure that is greater than the pressure available for common residential and/or municipal water distribution and supply systems. In some situations, various nozzles may be utilized to constrict the flow of the water to provide an increase in the pressure of the resultant water stream. However, many tasks may benefit from even greater pressures than can be achieved with common pressure nozzles that may be attached to a hose. In such circumstances pressure washers may be utilized, in which a power driven pump may be employed to increase the pressure significantly above pressures that are readily achievable using hose attachments. Such elevated pressures may greatly increase the efficiency and/or effectiveness of some cleaning and spraying tasks.

Generally, the power driven pump of a pressure washer may be driven by any suitable engine or motor. In some situations, the power driven pump of the pressure washer may be driven by a gasoline, diesel, or propane engine. The use of such engine driven pressure washers may allow mobility in use of the pressure washer, in that the pressure washer may be operated in locations that may not have ready access to electrical connection and/or may eliminate the need for using and managing extension cords. Additionally, in some situations, the use of an engine driven pressure washer may reduce or eliminate at least some of the safety hazards associated with the operation of electrical equipment in wet environments, which may be created through the use of the pressure washer.

SUMMARY

In an implementation, an electric starting system may include a self-contained housing configured to be mounted between an engine and a tool driven by the engine. The electric starting system may also include an electric motor mounted to the housing. The electric motor configured rotationally engage an output shaft of the engine to effectuate starting of the engine.

One or more of the following features may be included. The housing may be configured to be at least partially sandwiched between a mounting flange of the engine and a the tool. The tool may be mounted to the engine via the housing. The housing may include a plurality of mounting holes corresponding to mounting holes of the mounting flange and mounting holes of the tool. The starting system may also include a plurality of compression tubes respectively associated with each of the plurality of mounting holes to transmit compressive mounting forces between the mounting flange and the tool. The housing may include two or more sets of holes corresponding to two or more different mounting flange hole patterns.

The electric motor may be configured to one or more of directly rotationally engage the output shaft of the engine, and rotationally engage an input shaft of the tool that is rotationally coupled with the output shaft of the engine. The output shaft of the engine may include one or more of a power take-off (PTO) shaft of the engine and a crank shaft of the engine.

The electric motor may be configured to directly rotationally engage the output shaft of the engine. The electric starting system may further include a drivetrain configured to transmit rotational motion from the electric motor to the output shaft of the engine. The drivetrain may include one or more of a gear-based drivetrain, a belt-based drivetrain, and a chain-based drivetrain. The drivetrain may include a driven element providing selective rotational engagement between the electric motor and the output shaft of the engine. The drivetrain may include a driven element having a floating center of axis. The drivetrain may include an adapter including a first end defining a tapered opening for receiving at least a portion of the output shaft of the engine and a second, generally opposed, end defining a tapered protrusion for engaging an input of the tool. The adapter may be configured to rotationally couple the output shaft of the engine and the input of the tool. The adapter may be configured to be rotationally driven by the electric motor to effectuate starting of the engine.

The electric starting system may also include a battery box configured contain a battery capable of energizing the electric motor. The battery box may further include a switch for selectively energizing the electric motor. The battery box may further include an electrical connector for electrically coupling the battery with the electric motor. The battery box may be configured to be mounted to one or more of the engine and the tool. The electrical connector may be further configured for coupling the battery with an external battery charger. The battery box may include a bypass. The bypass may be configured to allow current from the external battery charger to bypass the switch during charging of the battery.

According to another implementation, a system may include an engine, a tool driven by the engine, and a starting system. The starting system may include a housing at least partially sandwiched between a mounting flange of the engine and the tool. The starting system may also include a driven element at least partially disposed within the housing. The driven element may be rotationally coupleable with one or more of an output shaft of the engine and an input shaft of the tool. The starting system may also include an electric motor associated with the housing. The electric motor may be configured to be energized to rotationally drive the driven element to start the engine.

One or more of the following features may be included. The starting system may include a drivetrain configured to transmit rotational motion from the electric motor to the driven element. The starting system may also include an overrunning clutch configured to provide selective rotational engagement between at least a portion of the starting system and one or more of the output shaft of the engine and the input shaft of the tool.

BRIEF DESCRIPTION OF THE DRAWINGS

FIGS. 32A-32D schematically depict an illustrative example embodiment of a wiring configuration that may be used in conjunction with a battery box assembly and an electric starting system, and associated features thereof, according to one example embodiment.

FIGS. 33A-33D schematically depict another illustrative example embodiment of a wiring configuration that may be used in conjunction with a battery box assembly and an electric starting system, and associated features thereof, according to one example embodiment.

DESCRIPTION OF ILLUSTRATIVE EXAMPLE EMBODIMENTS

Figure 1:
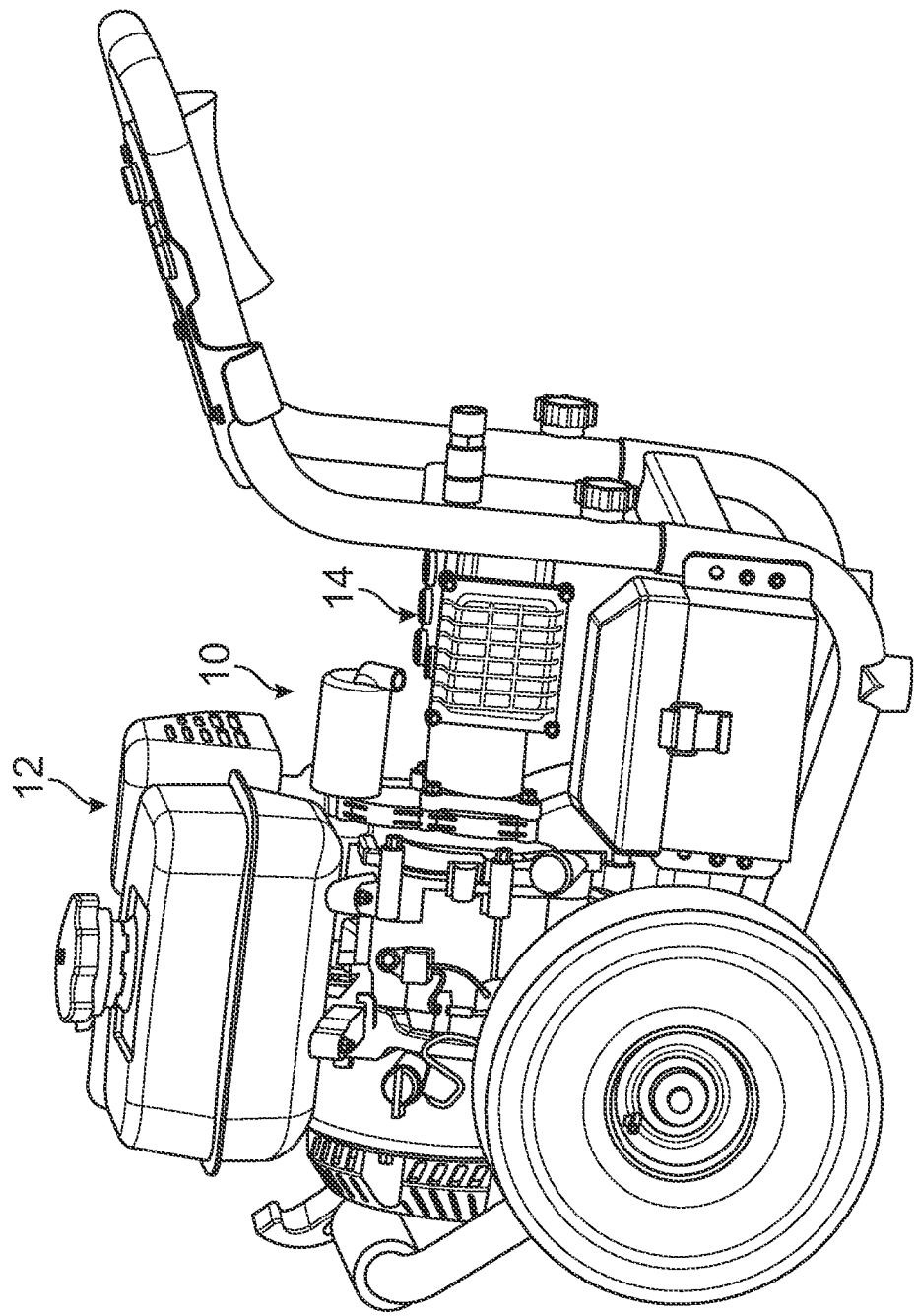
FIG. 1 depicts an pressure washer including an electric starting system, according to one example embodiment.

In general, some embodiments of the present disclosure may relate to electric starting systems for internal combustion engines, including, but not limited to, internal combustion engines used in connection with outdoor power equipment (e.g., pressure washers, lawn mowers, lawn tractors, snow blowers, rototillers, generators, as well as any other variety of power equipment). Consistent with some implementations, the starting system may include a self-contained assembly, or module, that may be added to (e.g., either during initial design of the power equipment and/or as a retrofit system added after initial design of the power equipment and/or after manufacture of the power equipment) to internal combustion engine driven power equipment to provide electric starting capabilities for an internal combustion engine/engine system (also generally referred to as an "engine," herein). Consistent with some embodiments, an engine that may not otherwise be provided with electric starting capabilities, when used in conjunction with an electric starting system consistent with some embodiments of the present disclosure, may be capable of being electrically started (e.g., rather than being started with a pull-cord starting mechanism, or other similar starting mechanism).

As such, a starting system according to some embodiments of the present disclosure may improve the ease of use and operation of the power equipment by making the engine easier to start (e.g., through requiring less physical effort by the operator to start the engine). Consistent with some embodiments, the starting system may also be used in connection with an engine that includes alternative starting arrangements (such as recoil starting arrangements). As such, in addition and/or as an alternative to starting the engine with the starting system, the engine may be started with the alternative starting arrangement.

As noted above, in some implementations, a starting system consistent with some implementations of the present disclosure may be utilized as a retrofit component, and upgrade component, or similar type improvement, for an existing unit of power equipment that does not include electric starting capabilities for the engine. For example, a pressure washer including a conventional pump mechanism and an engine with a pull-cord starting mechanism (e.g., a recoil starting system) may be retrofitted to include a starting system consistent with the present disclosure to provide a pressure washer with electric starting capabilities for the engine. The retrofitted, or upgraded, pressure washer, now including a pump assembly consistent with the present disclosure, may prove electric starting capabilities for the engine. Such electric starting capabilities for the engine may increase the ease of operation of the pressure washer, e.g., as by reducing the physical effort required to start the prime mover engine. As noted above, starting systems consistent with some implementations of the present disclosure may be utilized in connection with a variety of power equipment that is driven by an engine. As such, any description or discussion of example implementations (e.g., such as in connection with a pressure washer system) should not be construed as a limitation on the scope of possible use of the starting systems described herein.

In general, a starting system consistent with some embodiments of the present disclosure may include a self-contained system or module that may generally be configured to fit between an engine mounting flange and the device or tool coupled with and/or driven by the engine (herein generally referred to as the "tool"). The starting system may include a driven element that may be rotationally coupled to and/or rotationally engageable with the power take off shaft ("PTO shaft" or simply "PTO") of the engine that drives the tool. To start the engine, the driven element of the starting system may be rotationally driven by an electric motor and may, in turn, rotationally drive the PTO of the engine to crank the engine over and start the engine.

Figure 2:
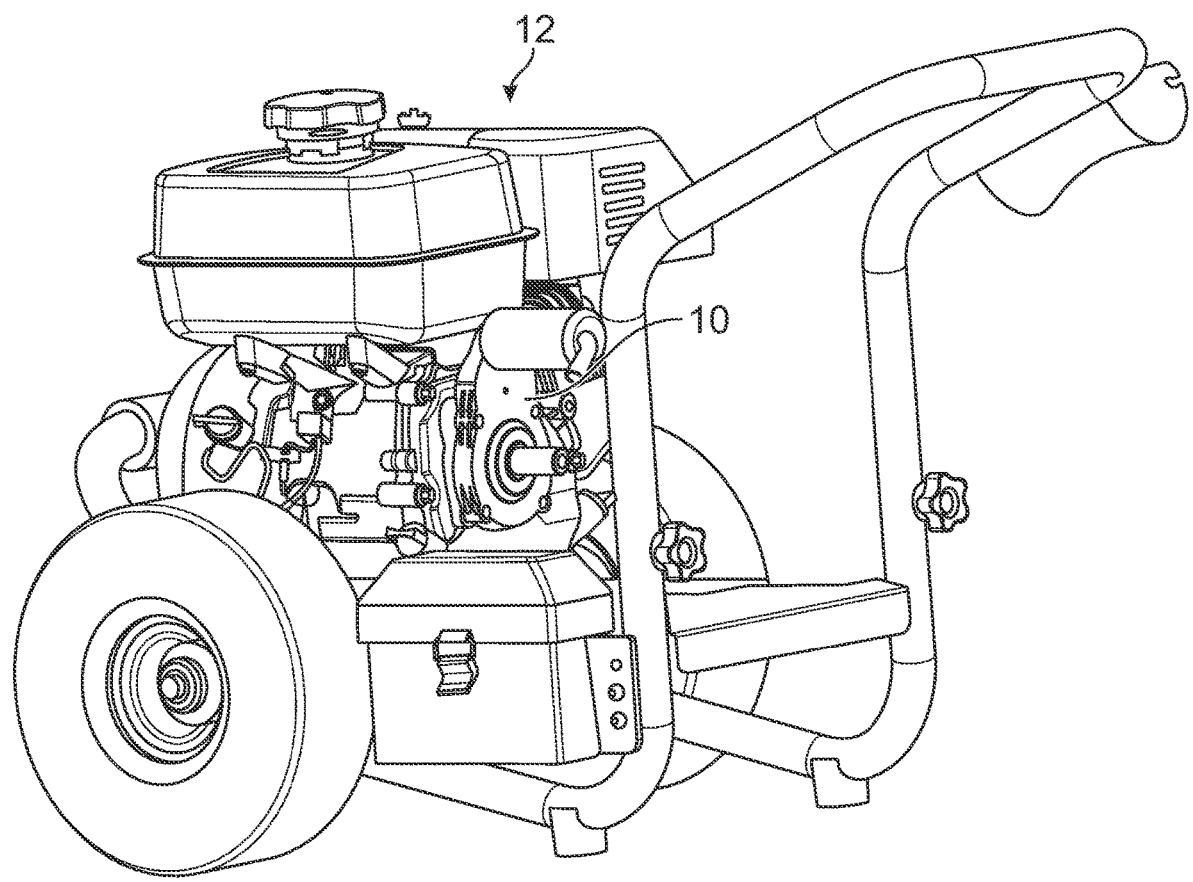
FIG. 2 depicts the pressure washer of FIG. 1 with the pump system removed, according to one example embodiment.
Figure 3:
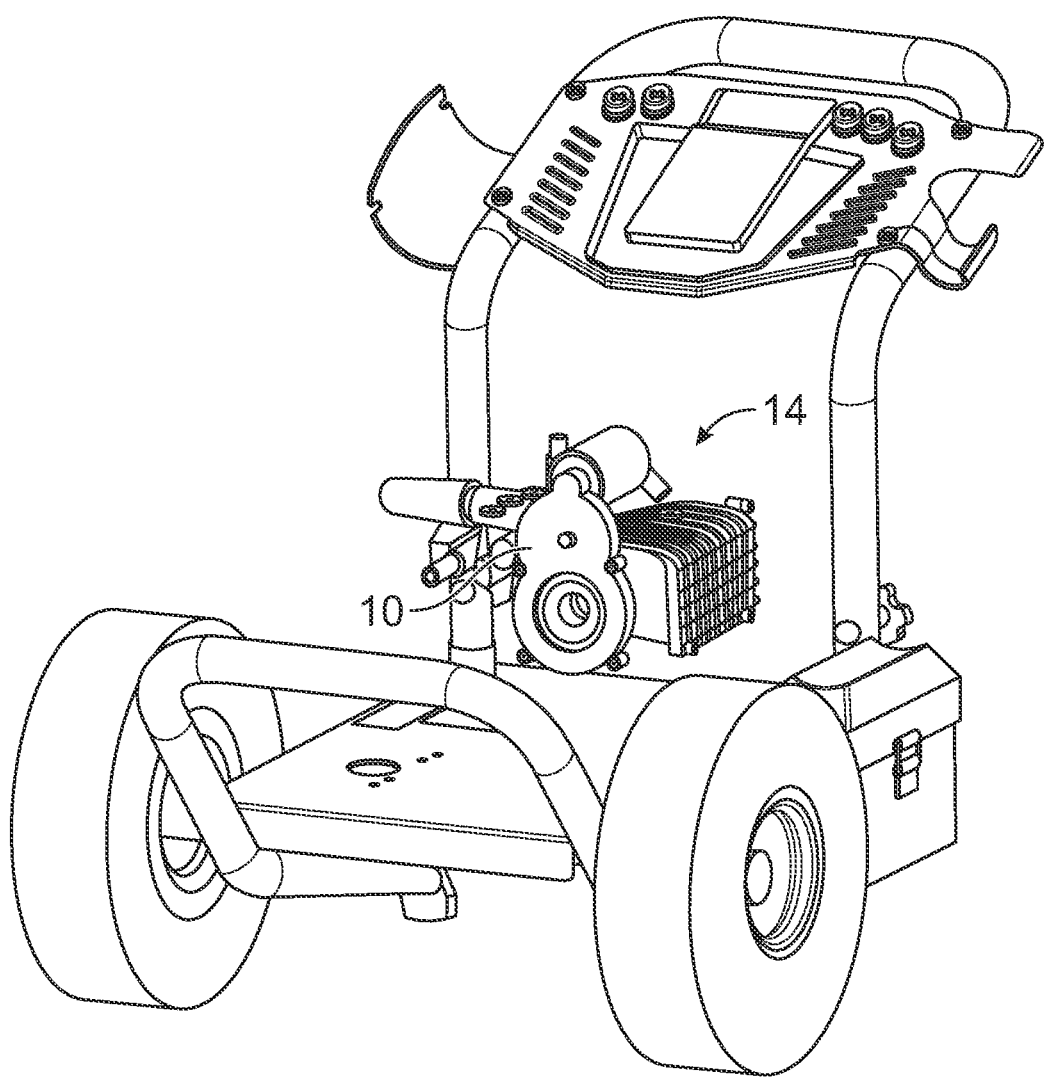
FIG. 3 depicts the pressure washer of FIG. 1 with the engine removed, according to one example embodiment.
Figure 4:
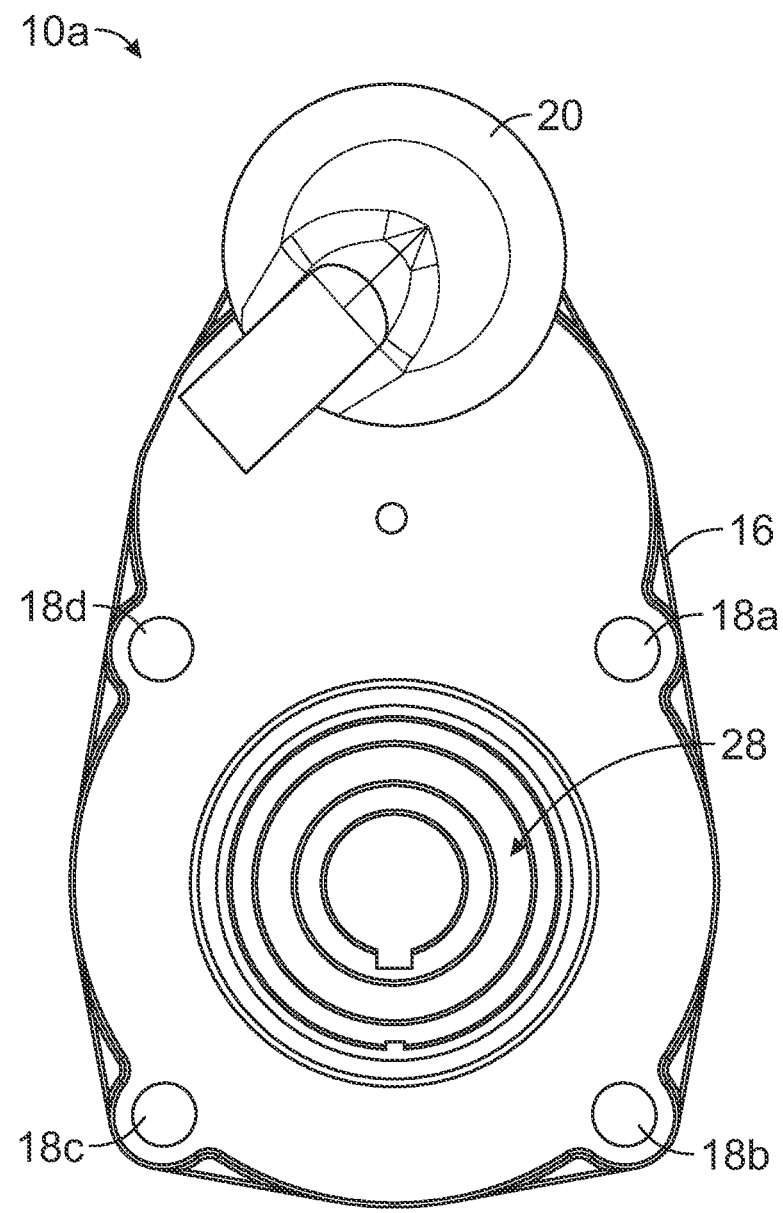
FIG. 4 is a front view of an illustrative example electric starting system, according to one example embodiment.
Figure 5:
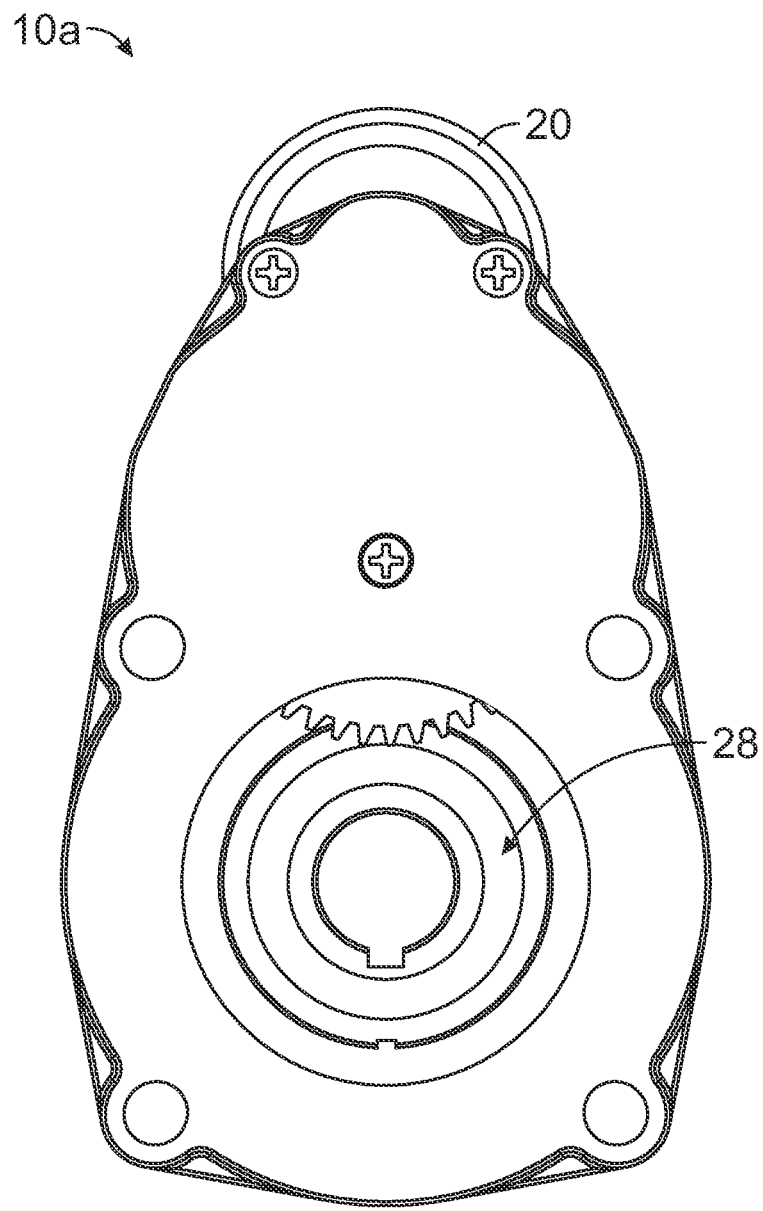
FIG. 5 is a rear view of the illustrative example electric starting system of FIG. 4, according to one example embodiment.
Figure 6:
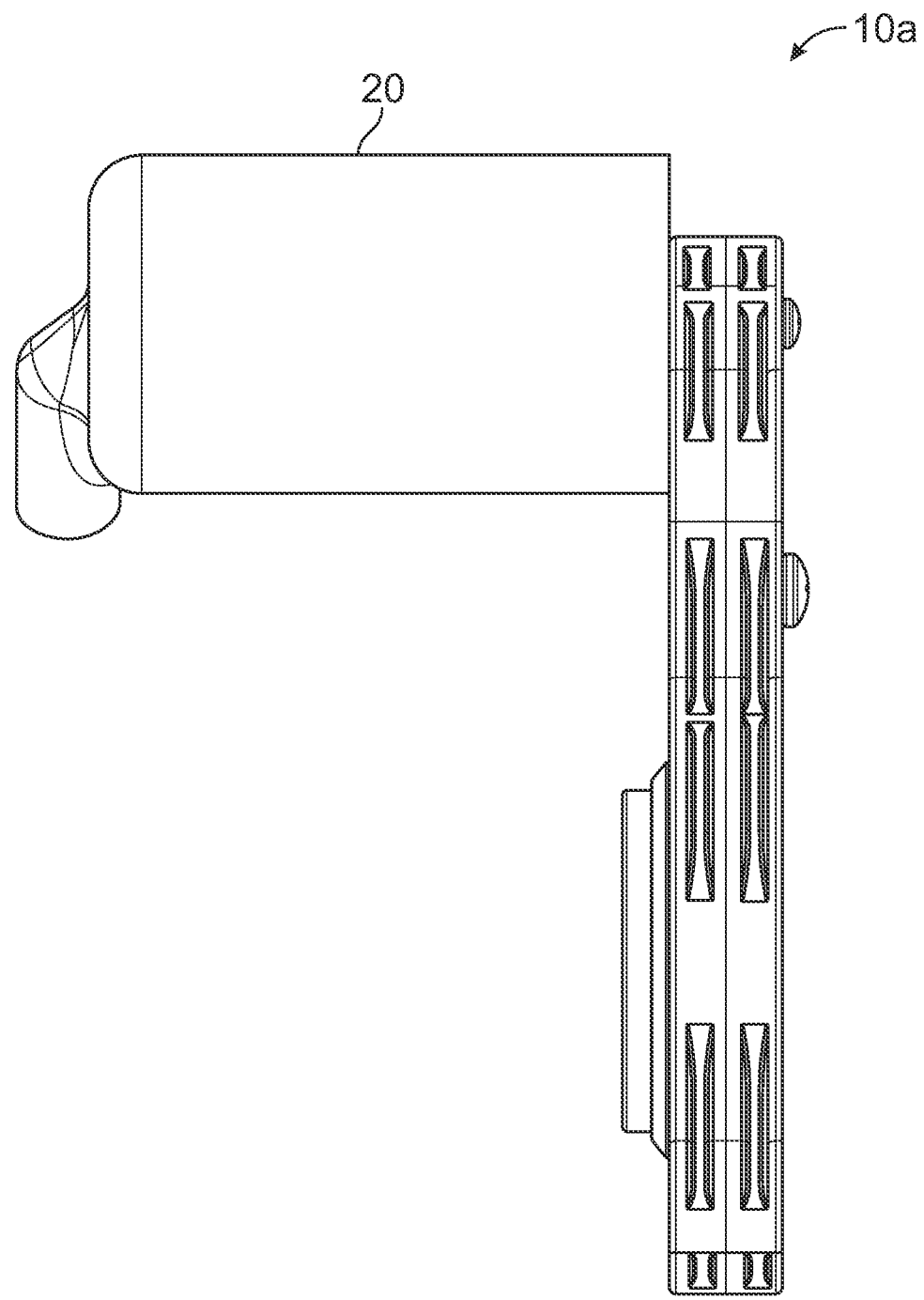
FIG. 6 is a side view of the illustrative example electric starting system of FIG. 4, according to one example embodiment.
Figure 7:
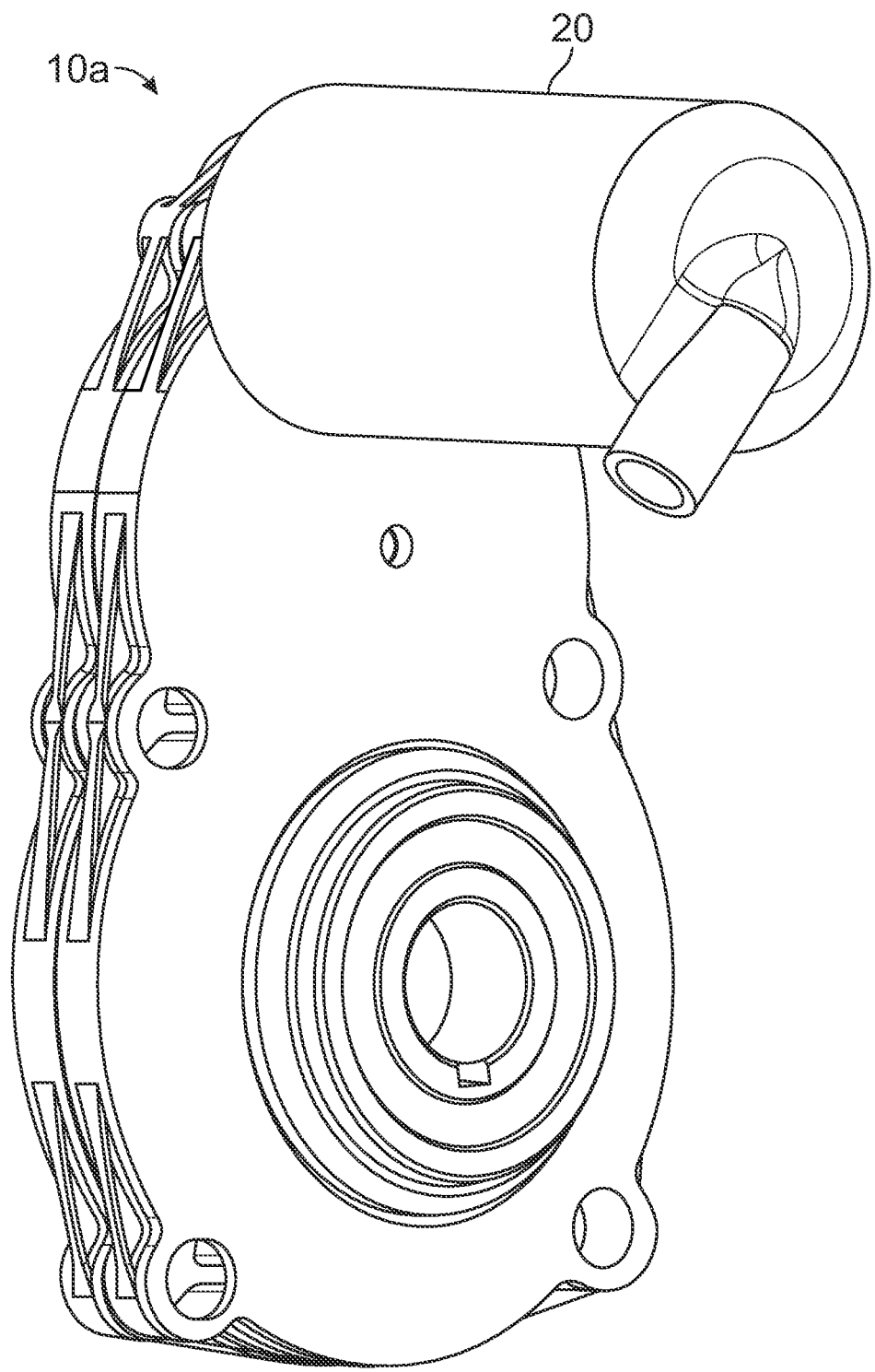
FIG. 7 is front perspective view of the illustrative example electric starting system of FIG. 4, according to one example embodiment.
Figure 8:
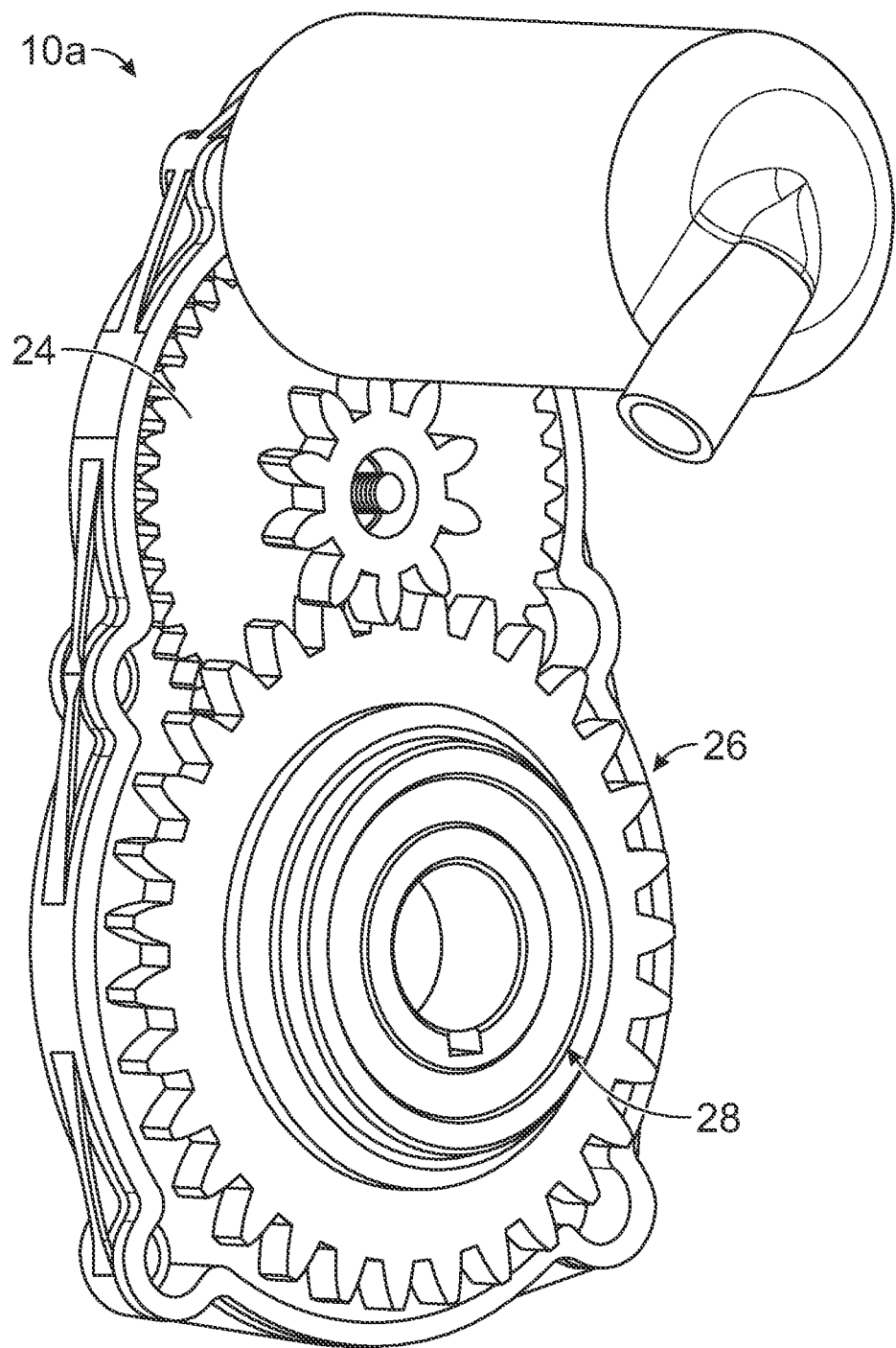
FIG. 8 depicts the illustrative example electric starting system shown in FIG. 7 with the front cover removed, according to one example embodiment.
Figure 9:
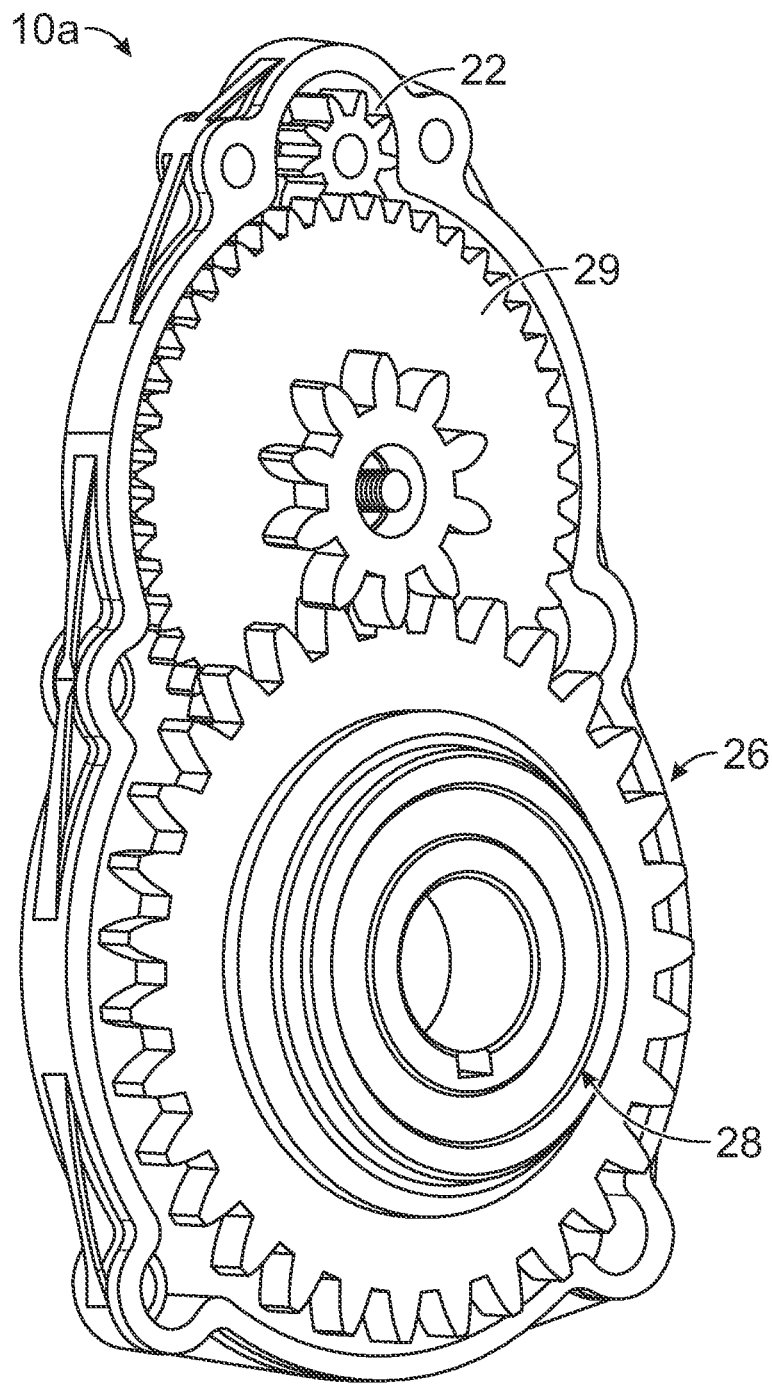
FIG. 9 depicts an example embodiment of a drivetrain that may be used in connection with the illustrative example electric starting system of FIG. 4, according to one example embodiment.
Figure 10:
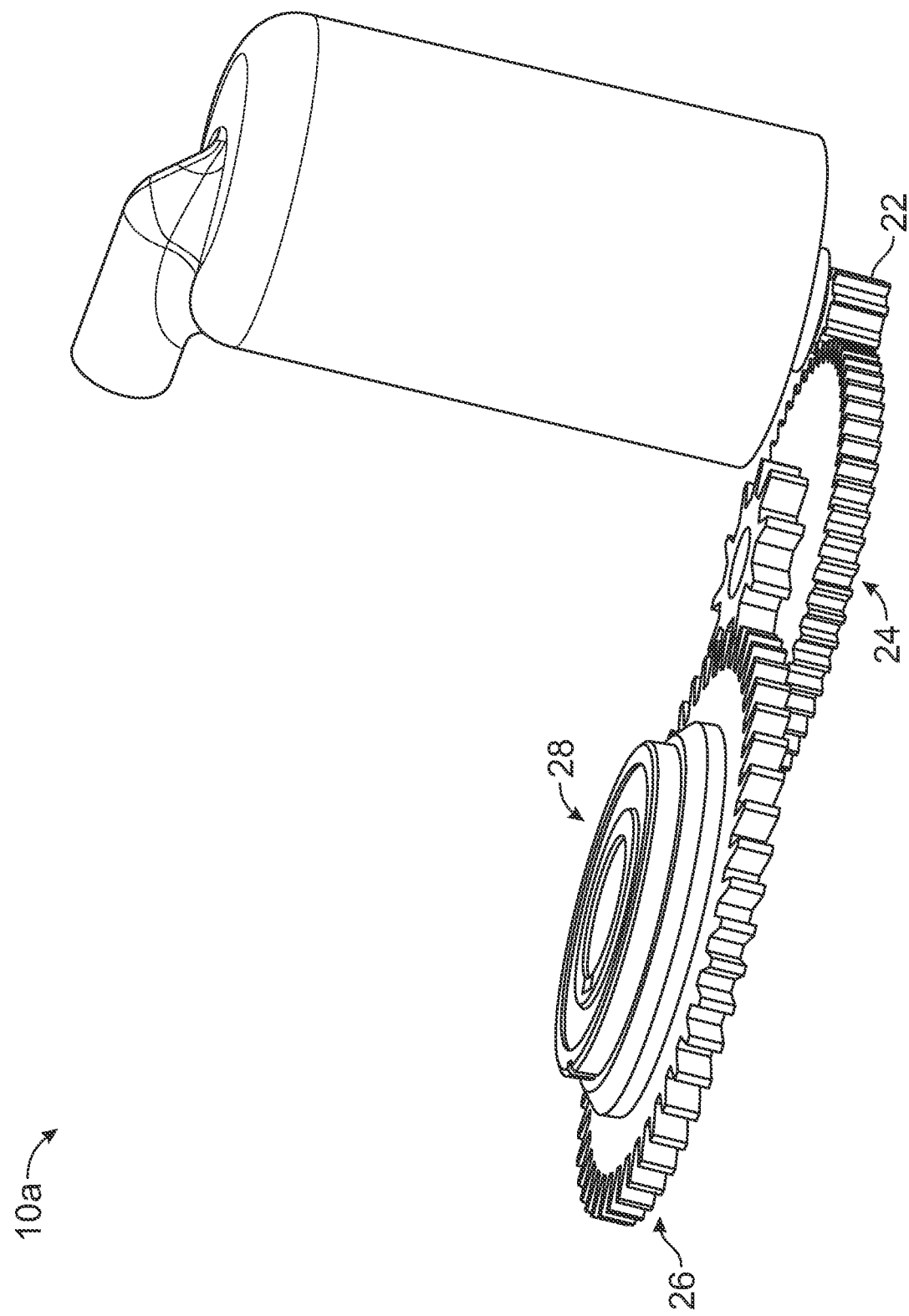
FIG. 10 depicts an example embodiment of a drivetrain and motor that may be used in connection with the illustrative example electric starting system of FIG. 4, according to one example embodiment.
Figure 11:
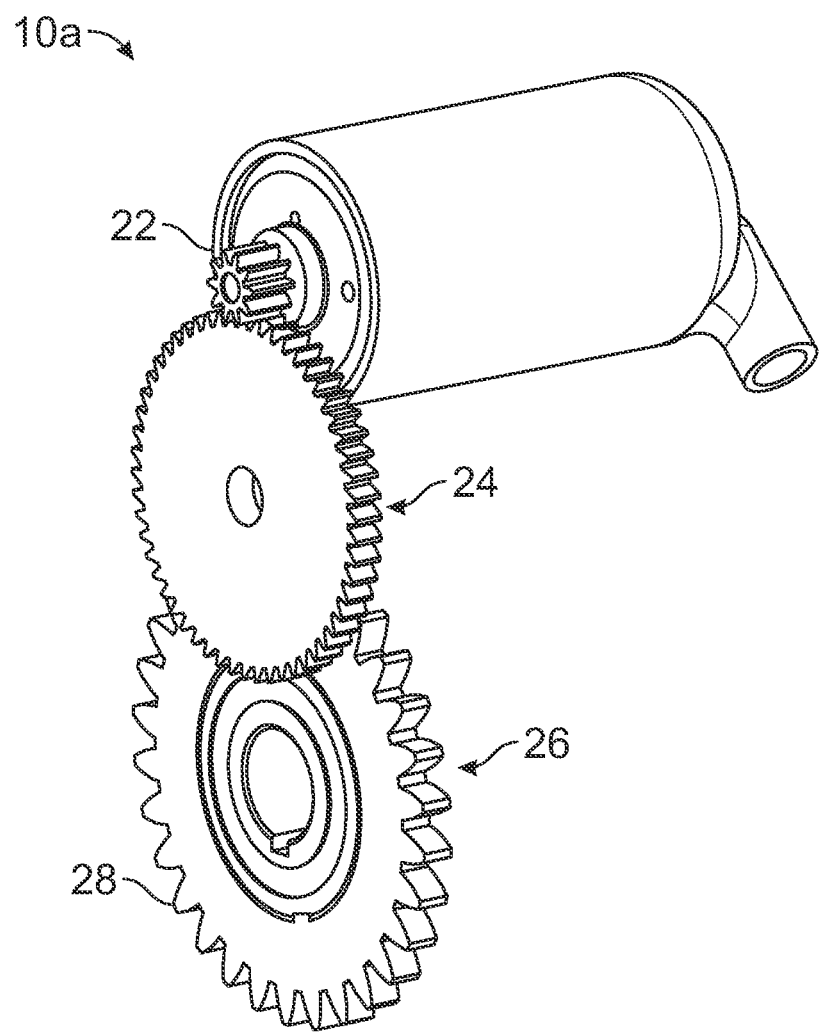
FIG. 11 is another view of the example embodiment of a drivetrain and motor shown in FIG. 10, according to one example embodiment.
Figure 12:
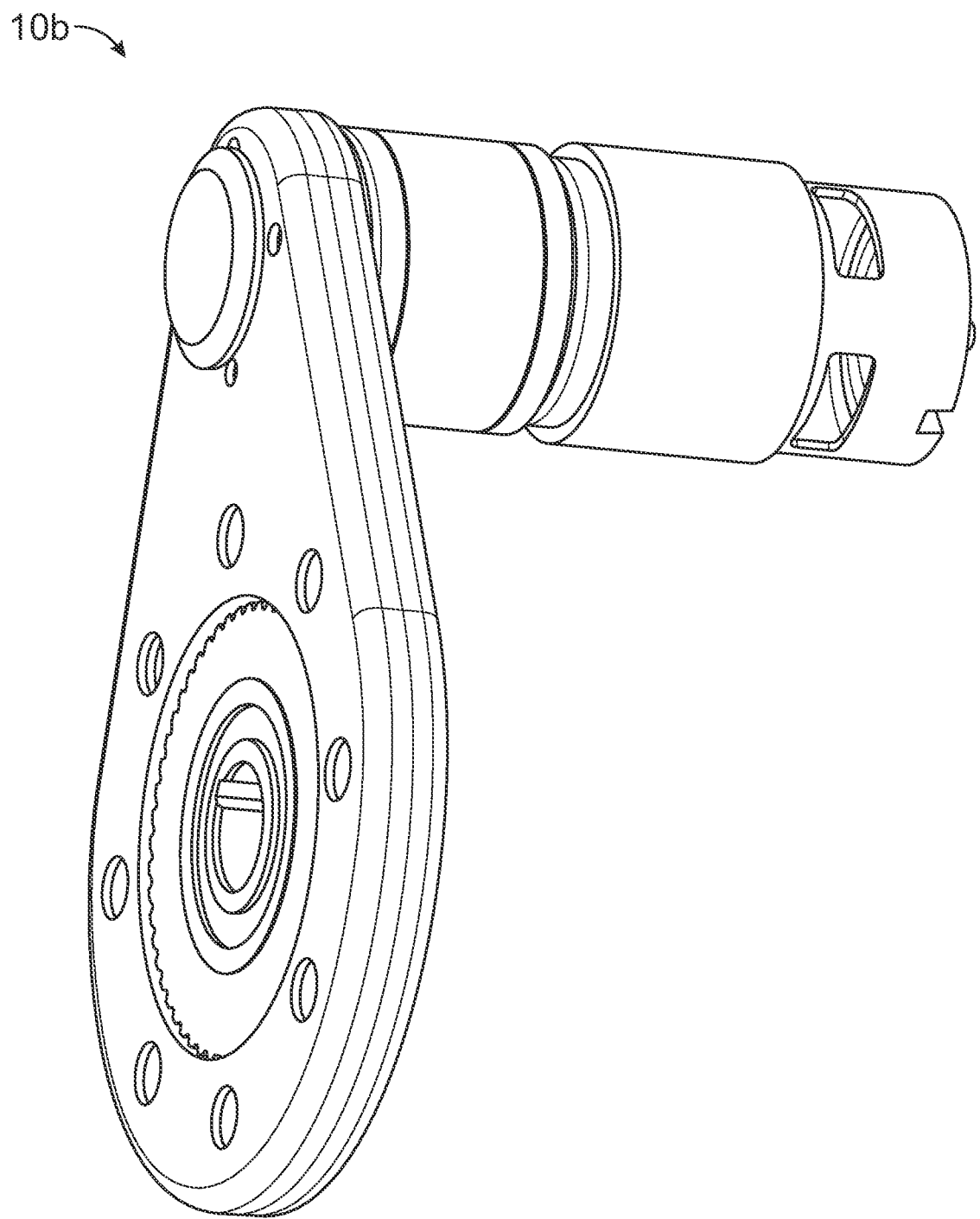
FIG. 12 is a perspective view of another illustrative example electric starting system, according to one example embodiment.
Figure 13:
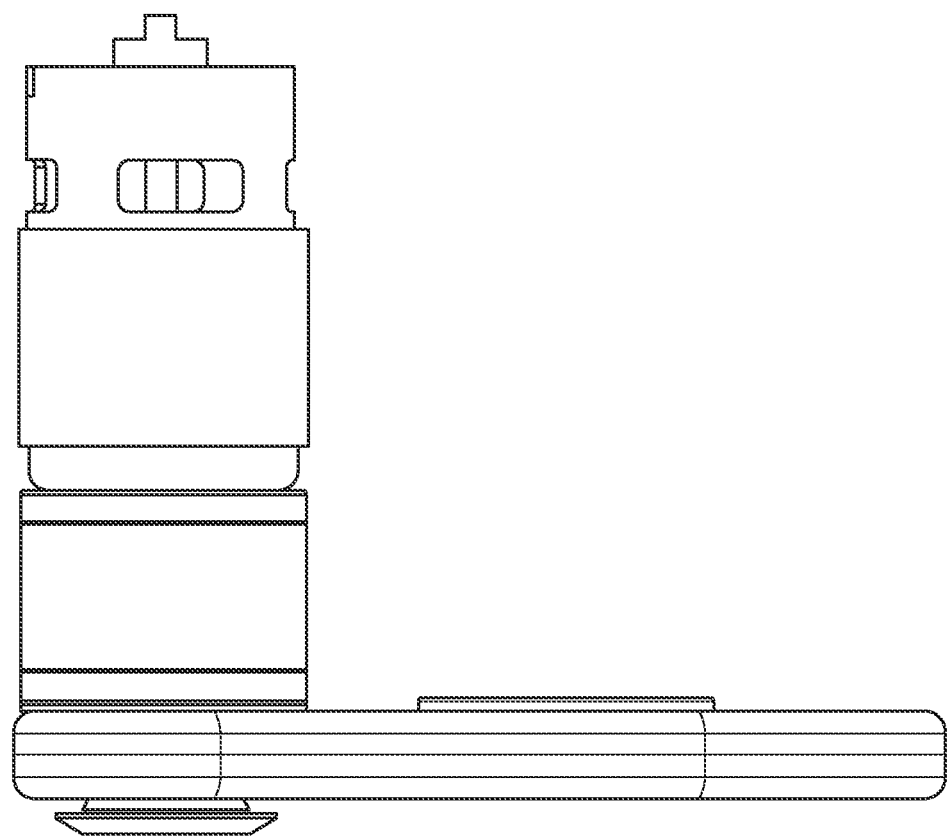
FIG. 13 is a side view of the illustrative example electric starting system of FIG. 12, according to one example embodiment.
Figure 14:
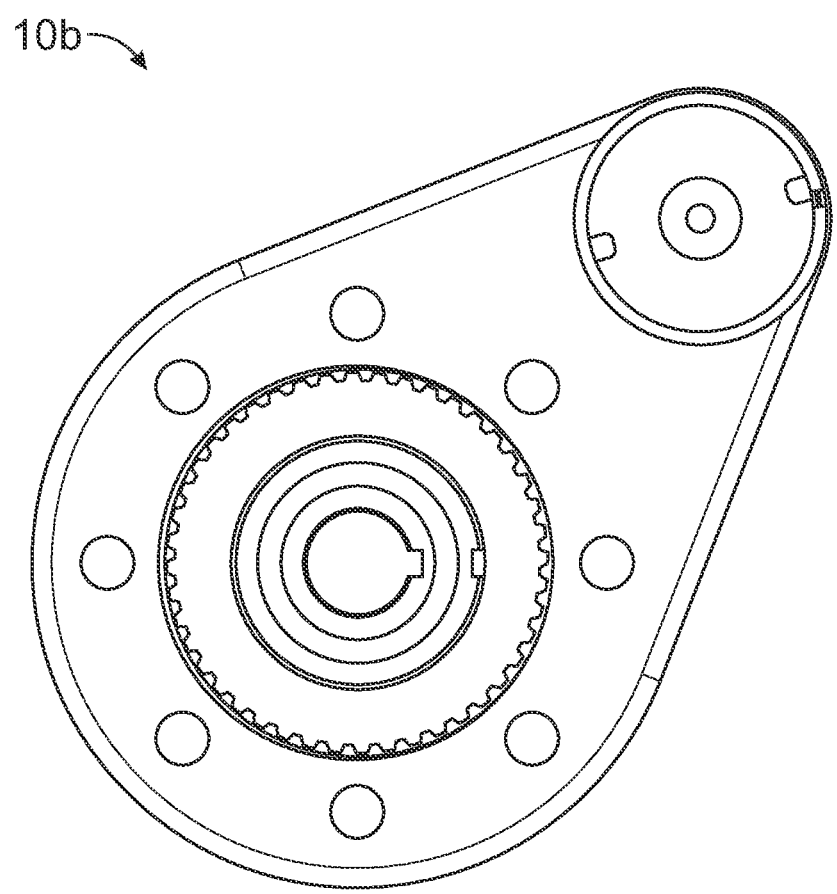
FIG. 14 is a front view of the illustrative example electric starting system of FIG. 12, according to one example embodiment.
Figure 15:
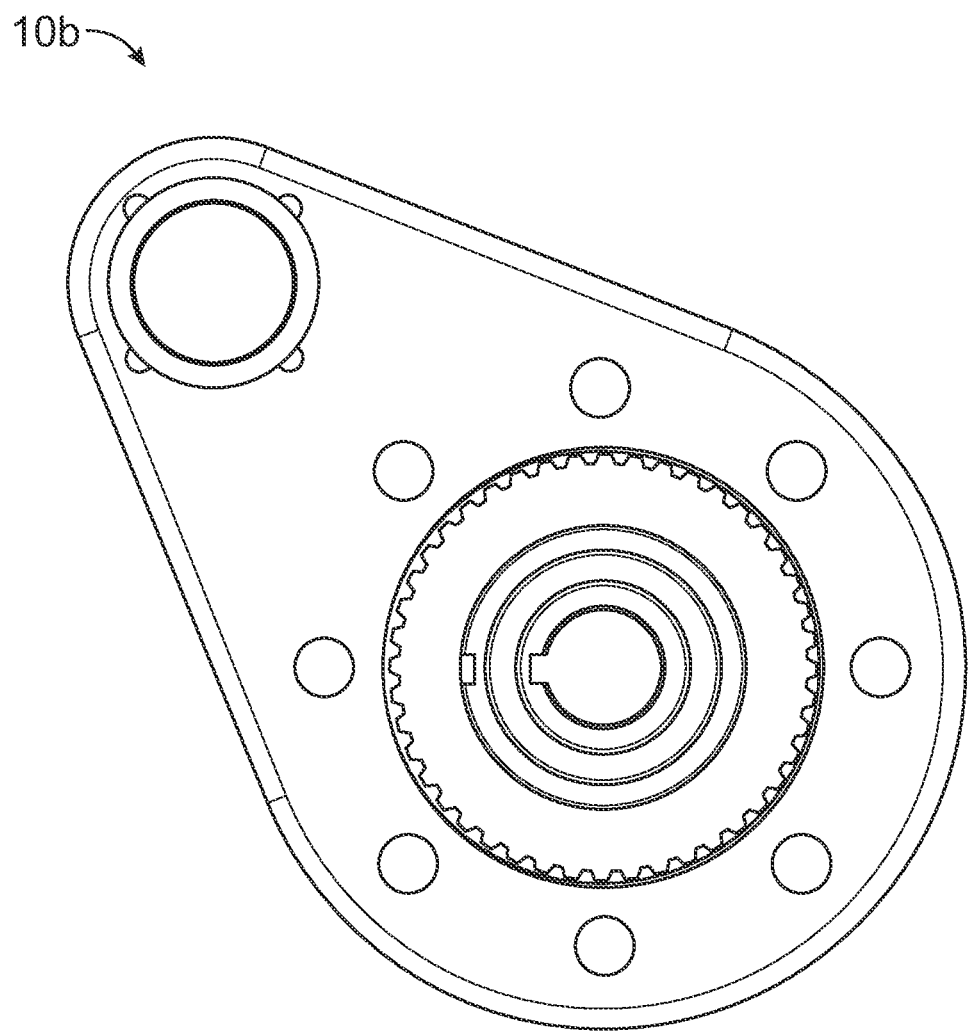
FIG. 15 is a rear view of the illustrative example electric starting system of FIG. 12, according to one example embodiment.

Referring to FIGS. 1-3, and illustrative example implementation of a starting system consistent with the present disclosure is generally shown. In the illustrated example embodiment, the starting system 10 is shown implemented in connection with a pressure washer, generally including an engine 12 driving a pump system 14. It will be appreciated that the illustrated implementation in connection with a pressure washer is for illustrative purposed only. As noted above, a starting system consistent with the present disclosure may be used in connection with any variety of power equipment including any type of accessory or tool that is driven by an engine. As shown in the illustrated example embodiment, the starting system 10 may generally be disposed between the engine 12 and the tool (i.e., the pump system 14 in the depicted embodiment). As generally shown, the starting system 10 may be configured to fit between the engine 12 and the pump system 14, e.g., as by being sandwiched between the engine mounting flange (e.g., to which the tool would typically be mounted) and the cooperating mounting flange of the tool (e.g., which would typically be used to mount the tool to the engine). For example, in some embodiments, the starting system may include one, or a pattern, of holes that may generally correspond with the bolt holes of the engine flange (and cooperating holes of the tool mounting flange). In such an embodiment, mounting bolts of sufficient length may be utilized to secure the tool to the engine mounting flange with the starting system therebetween, in a generally typical arrangement. In some other embodiments, the starting system may include a first mounting surface that may be configured to be mounted to the engine mounting flange (e.g., using the conventional bolt holes in the engine mounting flange), and may include a second mounting surface that may be configured to be mounted to a mounting flange of the tool (e.g., using cooperating bolt holes in the mounting flange of the tool).

Referring also to FIGS. 4 through 11, one illustrative example embodiment of a starting system 10*a*, consistent with the present disclosure, is shown. With particular reference to FIGS. 4 through 7, the starting system 10*a* may generally include a self-contained assembly, or module, including a housing 16 having a plurality of mounting holes 18*a*-*d*, e.g., which may be used to mount the starting system 10*a* between the engine flange and the tool (e.g., with mounting bolts extending through the mounting holes 18*a*-*d*. It will be appreciated that the number and arrangement of the mounting holes 18*a*-*d* may vary to suit different engine mounting flange bolting configurations and/or to suit different tool mounting bolt configurations. Additionally, it will be appreciated that, in implementations in which the starting system 10*a* may be generally sandwiched between the engine mounting flange and a mounting flange or surface of the tool, the housing 16 may provide suitable structural integrity to provide secure mounting of the tool to the engine (e.g., via the starting system), and to withstand the stress, vibration, and environmental conditions experienced during operation of the power equipment.

As also shown, the example starting system 10*a* may include an electric motor 20, e.g., which may be energized by a power source (such as a battery, an extension cord connected to a power distribution system, etc.) to rotationally drive the PTO of the engine (e.g., directly and/or by rotationally driving an input shaft of the tool) during starting of the engine. The electric motor may include any suitable electric motor, including, but not limited to, a brushed DC motor, a brushless DC motor, a pancake motor, a switched reluctance motor, etc. Additionally, while the electric motor 20 is shown being at least partially outside of the housing 16, in some embodiments, the electric motor may be substantially and/or entirely disposed within the housing.

Consistent with an embodiment, the starting system may include a drivetrain for conveying a rotational output of the electric motor to the PTO shaft of the engine. As is generally known, in some instances, the PTO may be an extension of the crankshaft of the engine. In other instances, the PTO may be configured to be rotationally driven by the crankshaft of the engine (e.g., either directly and/or through one or more gears, belts, chains, etc.). In some embodiments (e.g., in which the PTO may not be an extension of the crankshaft of the engine), a starting system consistent with the present disclosure may be configured to rotatably drive the crankshaft of the engine, rather than a PTO associated with the engine. As such, any disclosure of the starting system being coupled with and/or rotatably driving the PTO should also and/or alternatively be construed as including the starting system being coupled with and/or rotatably driving the crankshaft of an engine. In some embodiments, the drivetrain may provide suitable mechanical advantage to receive a relatively high rotational speed and relatively low torque input from the electric motor and provide an output (via the driven element of the starting system) to the PTO of the engine having sufficient torque and a suitable rotational speed for starting the engine. It will be appreciated that the mechanical advantage provided by the drivetrain may vary depending upon the output characteristics (e.g., rotational speed and torque) provided by the electric motor and the starting requirements (e.g., rotational speed and torque) of the engine. The drivetrain may generally include any suitable arrangement of gears, belt drives, chain drives, and combinations of any, or all, of the foregoing. Additionally, in some embodiments, the electric motor may include a pancake motor and/or switched reluctance motor that may be provide suitable rotational speed and torque for starting the motor, and may not require additional drive train components (and/or the electric motor may include integrated drivetrain components). In such an implementation, the electric motor may be directly rotationally coupled to the driven element of the starting system (e.g., by being built around the driven element and/or including the driven element as a rotating component of the electric motor).

Referring to FIGS. 8 through 11, in the illustrated example embodiment, the starting system 10a may utilize a gear-based drive train. As generally shown, the illustrated example drive train may generally include a pinion 22 directly driven by the electric motor 20 (e.g., the pinion may be rotationally coupled to the output shaft of the electric motor). The pinion 22 may, in turn, drive one or more additional gears (e.g., compound gear 24), which may ultimately rotationally drive the driven element 26 (e.g., which itself may, or may not, be a gear within the drivetrain). It will be appreciated the depicted drivetrain is intended for the purpose of illustration and explanation, and that a variety of differing configurations and combinations of gears may be utilized to achieve the desired rotational speed and torque at the driven element 26. As such, the particularly depicted drivetrain should not be construed as a limitation on the present disclosure.

In some implementations consistent with the present disclosure, the starting system may be configured to provide selective rotational engagement between at least a portion of the drivetrain and the PTO shaft of the engine. For example, the starting system may utilize an overrunning clutch, a selective mechanical engagement, a selective electromechanical and/or hydraulic engagement, or the like, for selectively rotationally coupling at least a portion of the drive train with the PTO shaft. For example, in some implementations, it may be desirable that the electric motor and/or some, or all, of the drivetrain of the starting system not be driven by the PTO when the engine is running. As such, it may be desirable to rotationally engage the electric motor and the drivetrain with the PTO when the starting system is being used to start the engine (e.g., which the electric motor is energized), and it may be desirable to rotationally disengage the electric motor and/or some or all of the drivetrain from the PTO when the engine is running.

In an example embodiment, the starting system 10 may include a one way bearing 28, which may be carried by the driven element 26 of the drivetrain. In some embodiments, the one-way bearing may generally function as an overrunning clutch, as well as a bearing for the PTO and/or the drivetrain. For example, the one way bearing may have a keyed interface, e.g., which may be keyed to the PTO and/or to the input shaft of the tool (e.g., which may be rotationally coupled to the PTO via a keyed engagement, a spline, a press fit, etc.). During starting of the engine, when the electric motor 20 is energized, the one way bearing may transmit rotational force from the driven element 26 to the PTO (and/or the input shaft of the tool) when the driven element is rotating at an equal or greater rotational speed relative to the PTO. Once the engine starts, the engine (and therefore the PTO) may operate at a faster rotational speed than the input from the driven element 26. When the PTO is operating at a faster rotational speed than the driven element 26, the one way bearing may rotationally disengage from the driven element 26, such that the driven element 26, as well as upstream components of the starting system drivetrain, may not be driven by the PTO. As such, the drivetrain of the starting system may not be subjected to the higher rotational speeds and/or loads from the PTO (e.g., with the drivetrain being isolated from the PTO by the bearing). In addition/as an alternative to a keyed interface between the one way bearing and the PTO, a splined, press fit, or other interface may be used for transmitting rotational force from the driven element to the PTO.

In an embodiment, the one way bearing and/or the driven element may have a floating center of axis. That is, the center axis of the one way bearing 28 and/or the driven element 26 may be capable of some degree of lateral displacement. This floating center of axis configuration may allow for industry standard tolerances of the position of the PTO shaft relative to the position of the engine mounting flange bolt pattern (e.g., an SAE J609 mounting flange bolt circle, or another other suitable bolt pattern arrangement). This arrangement may prevent and/or reduce the occurrence of binding between the driven element 26 and the remainder of the starting system drivetrain/assembly when mounted, or otherwise coupled, to the engine.

As generally mentioned, the starting system may rotationally drive the PTO and/or the input shaft of the tool, which may, in turn, by rotationally coupled to the PTO (and thereby transmit the rotational force from the starting system to the PTO for starting the engine). Any suitable rotational coupling may be utilized, including, but not limited to, a keyed connection, a splined connection, a press fit, or any other suitable rotational connection.

Figure 16:
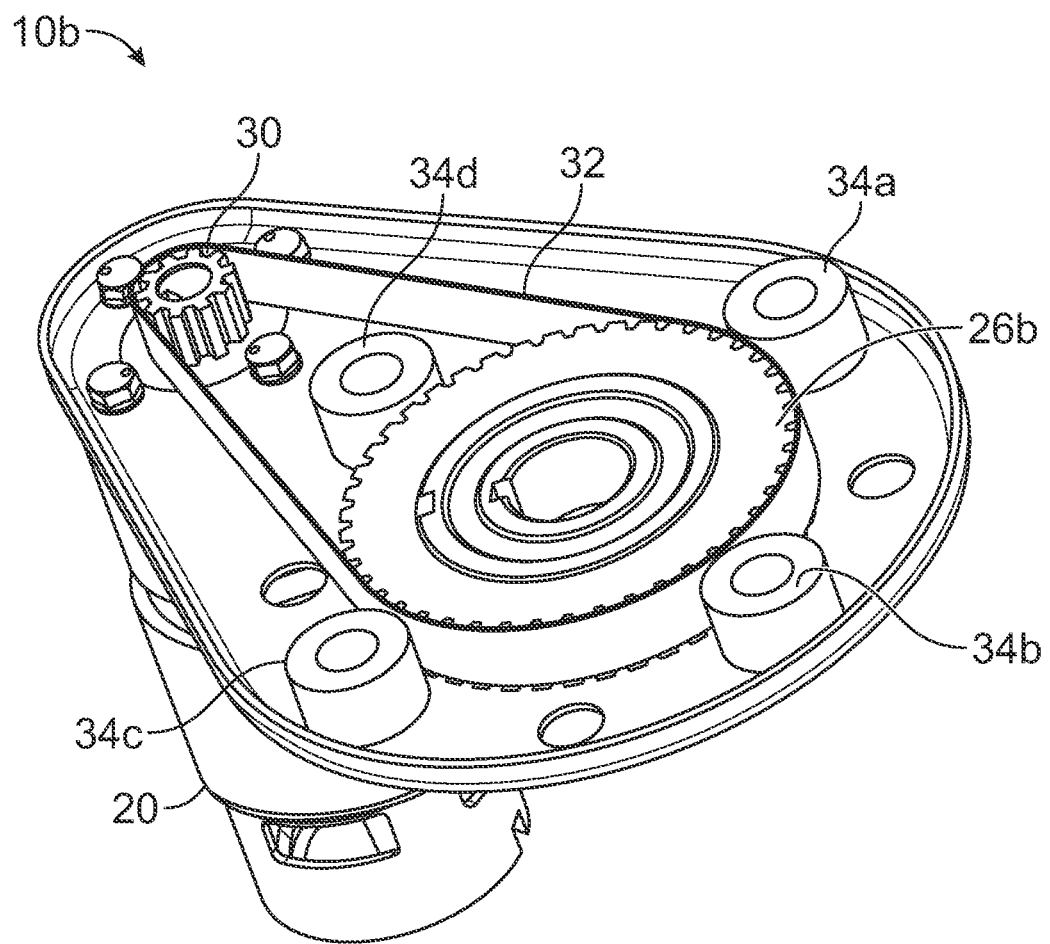
FIG. 16 is a perspective view of the illustrative example electric starting system of FIG. 12 with the rear cover removed.
Figure 17:
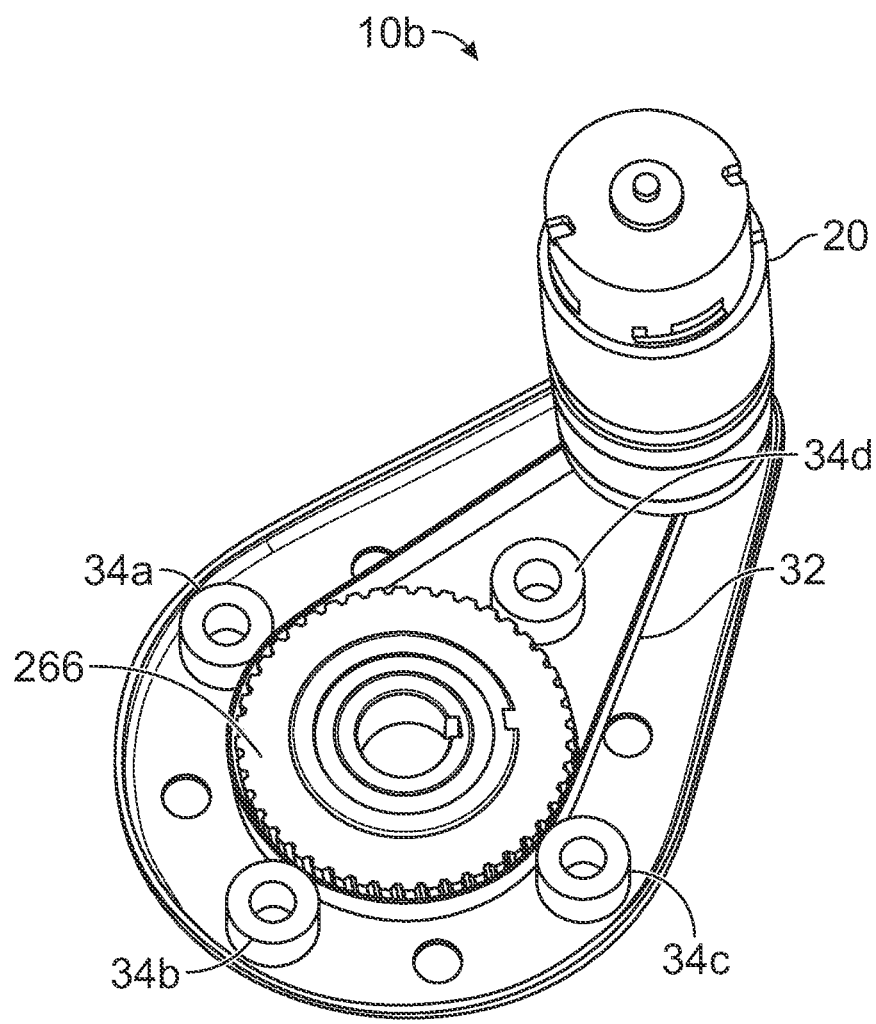
FIG. 17 is a perspective view of the illustrative example electric starting system of FIG. 12 with the front cover removed.
Figure 18:
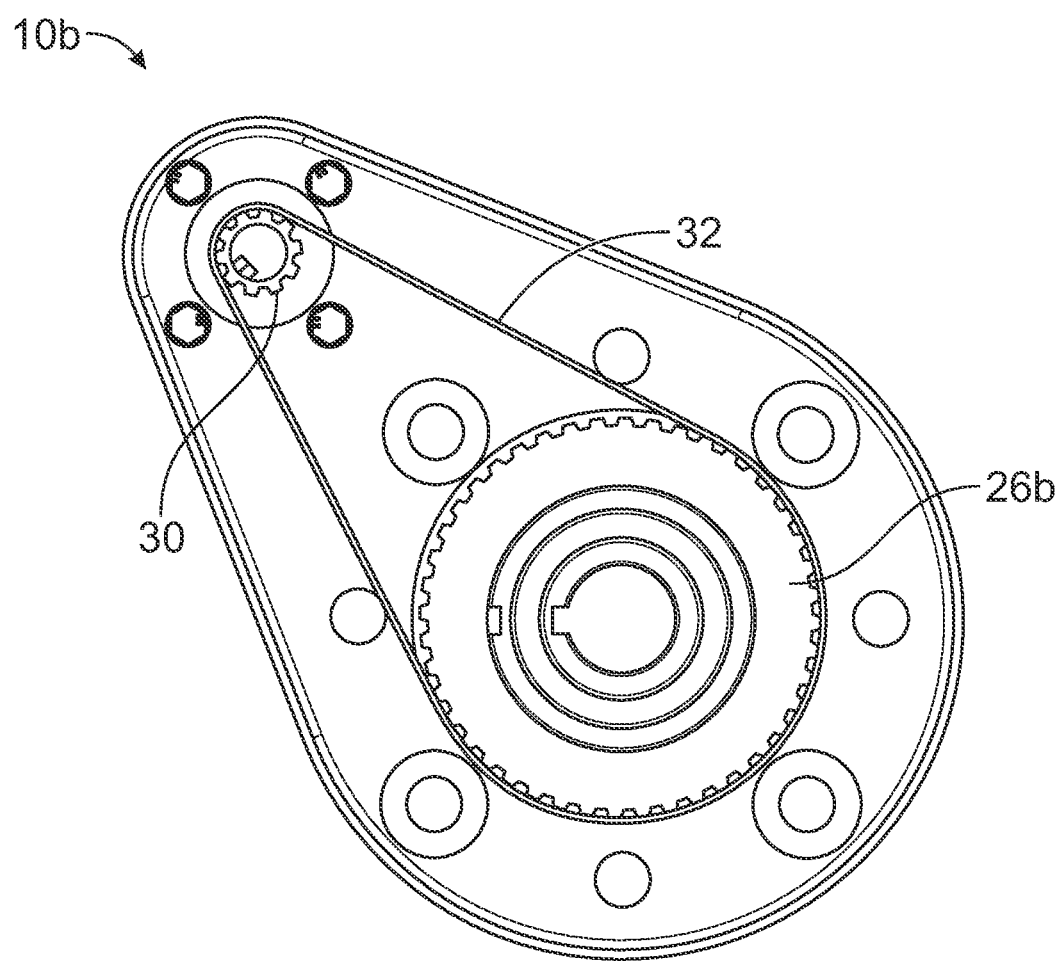
FIG. 18 is a plan view of an example embodiment of a drivetrain that may be used in connection with the illustrative example electric starting system of FIG. 12, according to one example embodiment.
Figure 19:
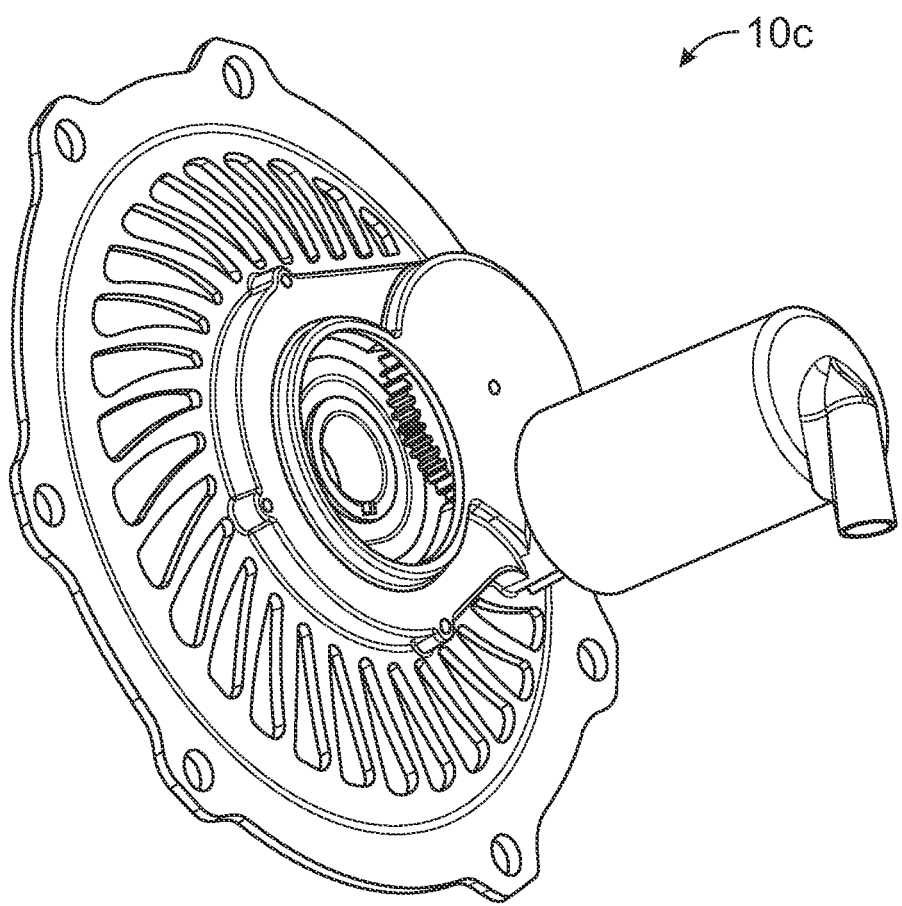
FIG. 19 is a perspective view of another illustrative example electric starting system, according to one example embodiment.

As generally discussed above, the drivetrain of the starting system may utilize any suitable arrangement for transmitting rotational force and providing a desired mechanical advantage. With reference to FIGS. 12 through 18, another illustrative example embodiment of a starting system 10b is shown. With particular reference to FIGS. 16-18, as shown the starting system 10b may utilize a belt-based drivetrain. For example, a drive sprocket 30 may be rotationally coupled to the output shaft of the electric motor 20. A belt 32 may be engaged around the drive sprocket 30 and may be drivingly engaged with driven element 26b. Accordingly, when the electric motor 20 is energized, the electric motor 20 may rotate the drive sprocket 30, which may, in turn, rotational drive the driven element 26b. While the drive sprocket 30 and the driven element 26b are generally shown as toothed cogs, e.g., which may be used in conjunction with a toothed belt, it will be appreciated that the drive sprocket and the driven element could similarly be configured as smooth pulleys or wheels (e.g., as may be used with a flat belt), grooved pulleys or wheels (e.g., as may be used with a v-belt). In various embodiments, the starting system 10b may include generally corresponding features as the first illustrated example embodiment, such as a one way bearing arrangement, and the like. Additionally, it will be appreciated that, rather than the belt, a chain may be utilized (e.g., with appropriately cooperating sprockets). Further, the drivetrain may utilize combinations of gear, belt, and/or chain drive arrangements. In some implementations, a belt-based drivetrain may be mechanically more efficient and provide quieter operation than a gear-based drivetrain, however a gear-based drivetrain may, in some situations, be more robust and require less maintenance and/or be more tolerant of harsh environmental conditions.

With particular reference to FIGS. 16 and 17, in some embodiments, the starting system may include compression tubes or spacers (e.g., spacers 34a-d). The spacers 34a-d may, in some embodiments improve the compressive strength of the starting system, for example, when the starting system is sandwiched between the engine mounting flange and the tool. The improved compressive strength may allow a desired mounting bolt torque to be utilized without damaging the starting system.

Embodiments of an electric starting system consistent with the present disclosure may be used in connection with a wide variety of engine layouts and configurations, and engines including a wide variety of tool mounting flanges, and other features. For example, in some implementations the previously depicted and described illustrative embodiments of electric starting systems may be generally configured to use with engines configured to present a generally horizontal PTO. Although, it will be appreciated that the illustrative embodiments may also be used in connection with engines having other configurations (e.g., engines configured to present a generally vertical PTO and/or other configurations). With reference to FIGS. 19-24, and illustrative example embodiment of an electric starting system 10c is depicted, in which the starting system 10c may be generally configured to provide suitable applications to some varieties of engines having a generally vertical PTO (i.e., engines that may have a generally vertical PTO when used in an intended design configuration, but which may, in some instances, be operated with the PTO oriented at an angle relative to vertical). Similar to previously described embodiments, starting system 10c may have generally include an electric motor and a drivetrain for transmitting rotational force from the electric motor to the PTO (e.g., with the drivetrain providing a suitable mechanical advantage to facilitate starting the engine by the motor, as discussed above). While the illustrated example embodiment of the starting system is generally shown including a gear-based drivetrain, it will be appreciated that other drivetrains may suitably be utilized (e.g., belt-based drivetrains, chain-based drivetrains, drivetrains utilizing combinations of one or more of gears, belts, and/or chains, etc.). Similarly, and as generally described above, in some embodiments the starting system 10c may be configured to be selectively engageable with the PTO of the engine (e.g., using a one way bearing, or other configuration, as generally discussed).

Figure 20:
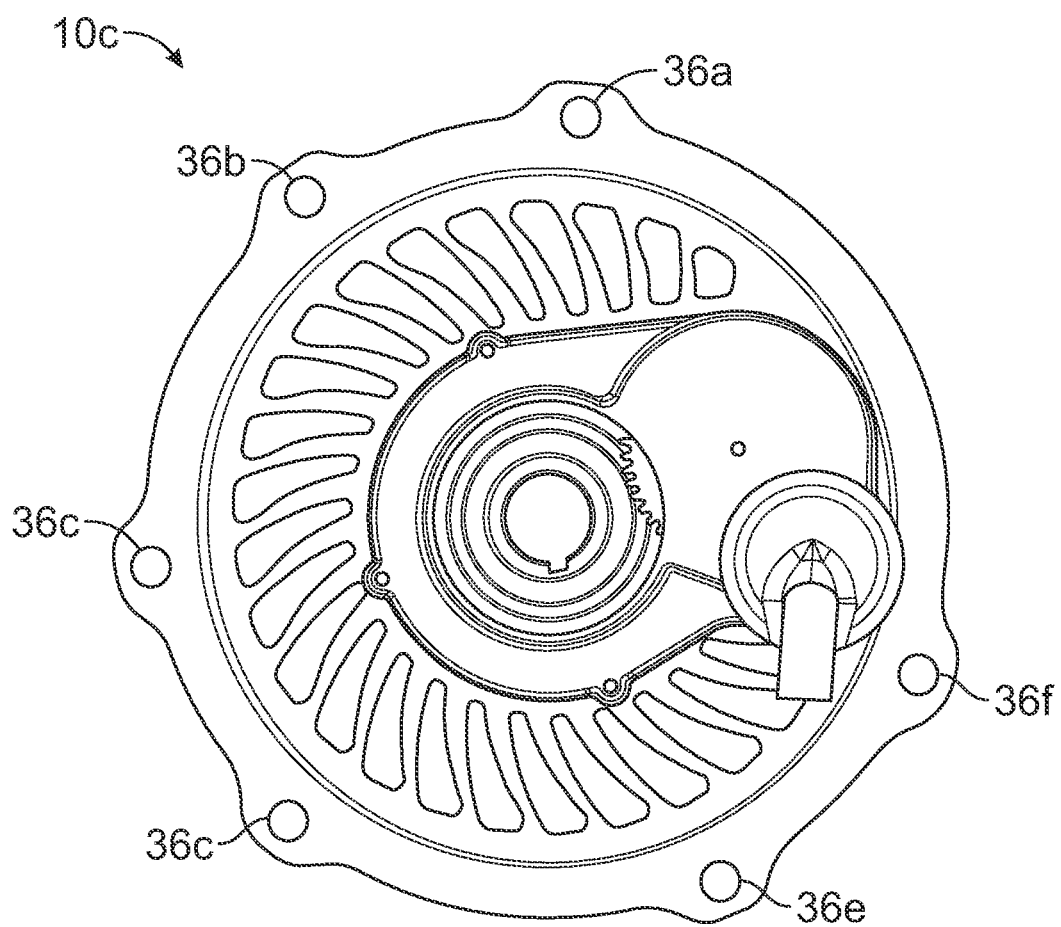
FIG. 20 is a front view of the illustrative example electric starting system of FIG. 18, according to one example embodiment.
Figure 21:
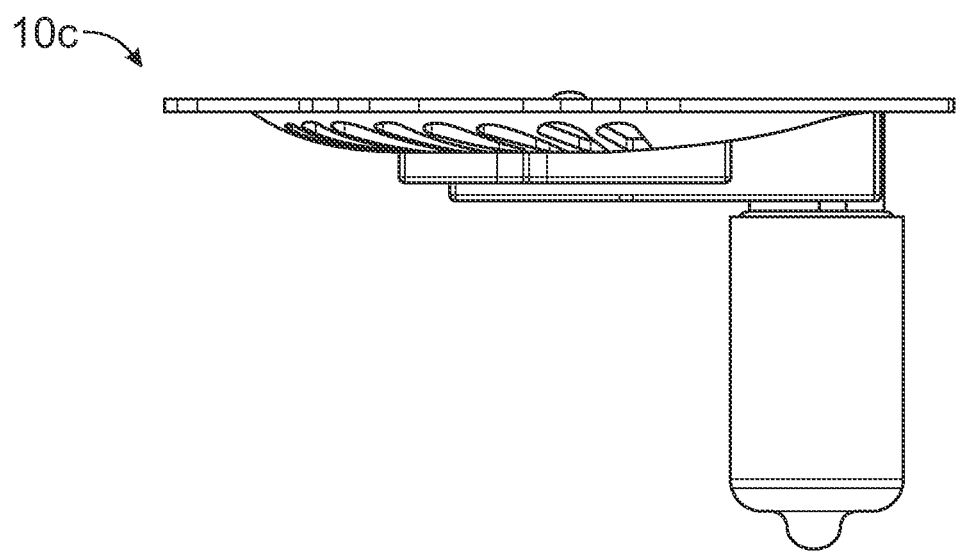
FIG. 21 is a side view of the illustrative example electric starting system of FIG. 18, according to one example embodiment.
Figure 22:
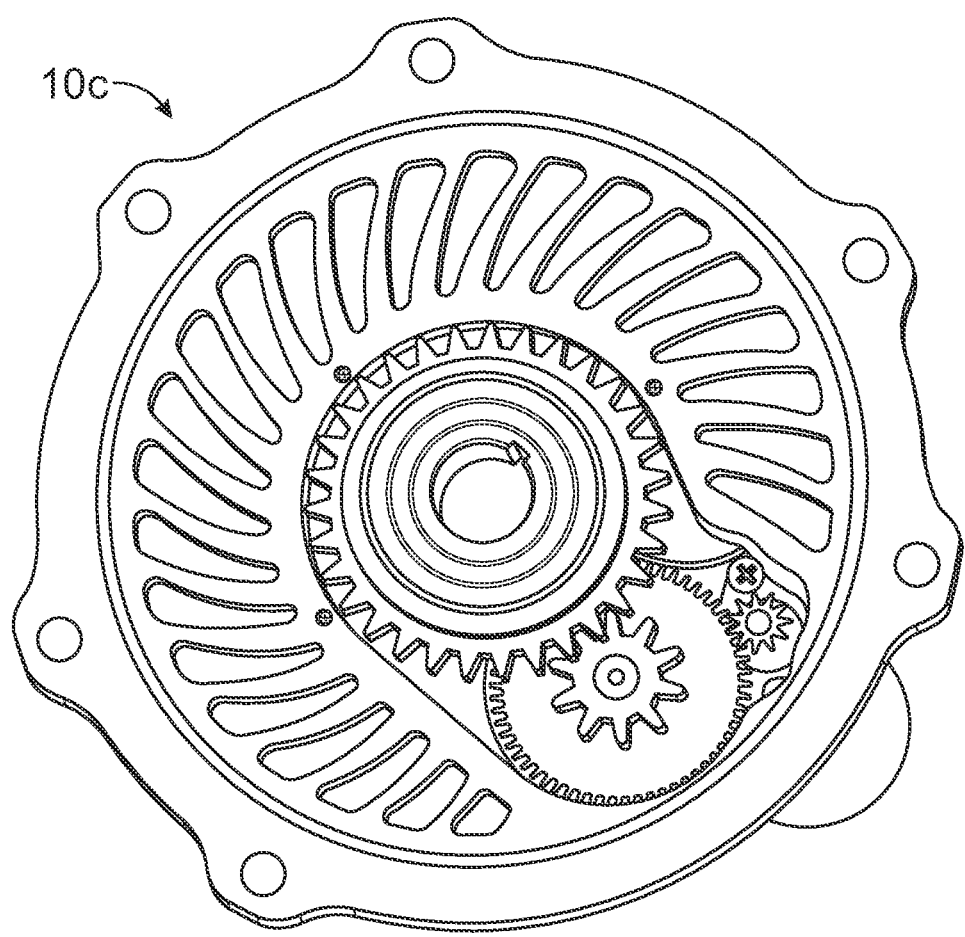
FIG. 22 is a rear view of the illustrative example electric starting system of FIG. 18 with a cover removed to depict an illustrative example of a drivetrain that may be used in connection with the electric starting system, according to one example embodiment.
Figure 23:
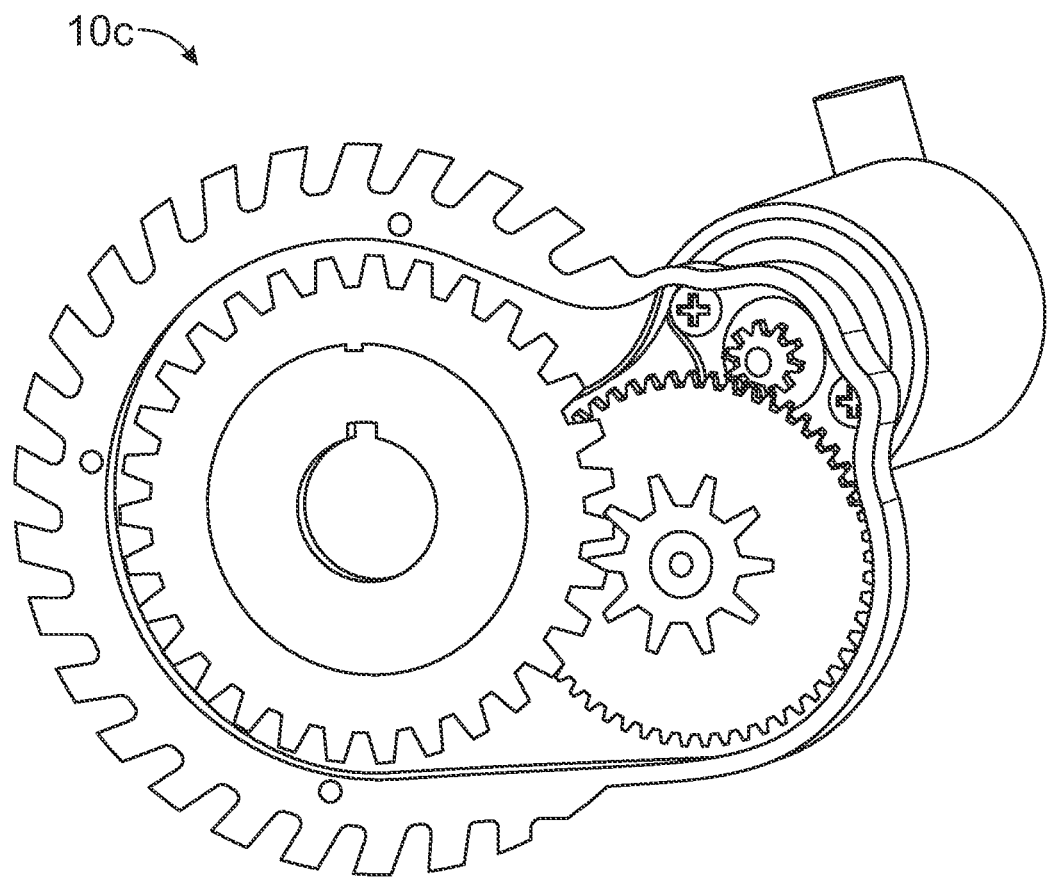
FIG. 23 is a cross-sectional view of the illustrative example electric starting system of FIG. 18 depicting an illustrative example of a drivetrain that may be used in connection with the electric starting system, according to one example embodiment.
Figure 24:
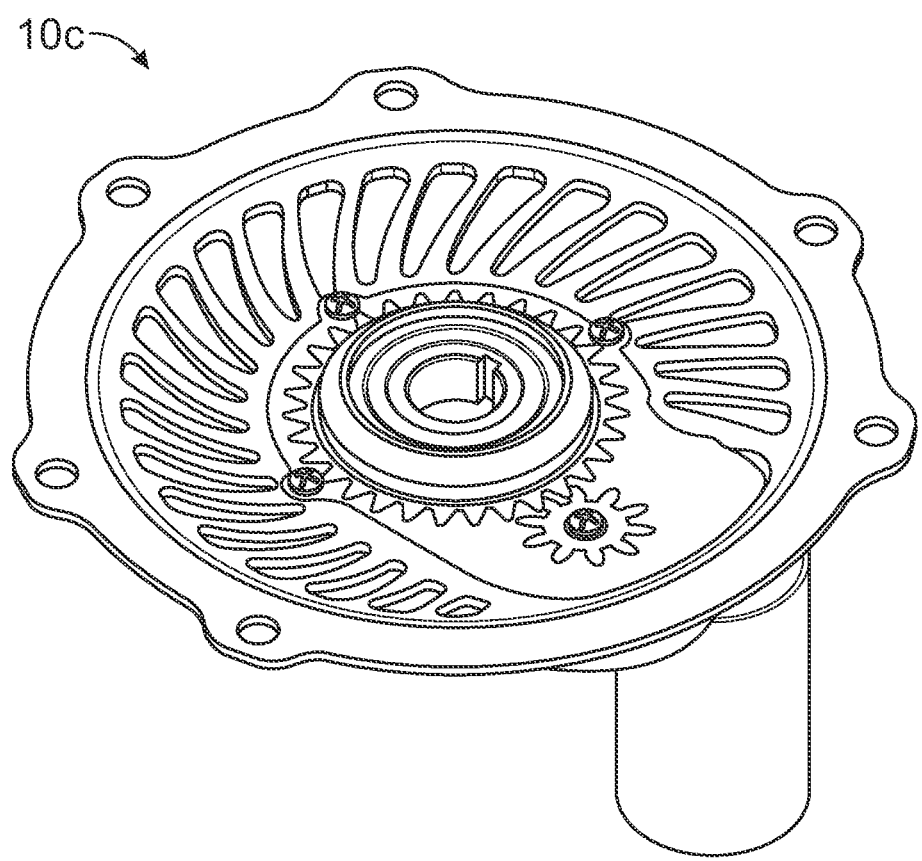
FIG. 24 is a perspective view of the illustrative example electric starting system of FIG. 18 with a cover shown partially transparent to depict an illustrative example drivetrain that may be used in connection with the electric starting system, according to one example embodiment.

In some instances, engines configured to provide a generally vertical PTO may have specific flange bolt patterns (e.g., via which a tool coupled with and/or driven by the PTO may be coupled to the engine). Such bolt patterns may be dictated by the manufacturer of the engine, dictated (and/or informed by) industry standards (such as SAE). With particular reference to FIG. 20, in some embodiments consistent with the present disclosure, the starting system 10c may include engine flange mounting holes 36a-f, e.g., which may allow the starting system to be mounted to the engine and/or sandwiched between the engine mounting flange and a tool to be driven by the engine. Consistent with the illustrated embodiment, the engine flange mounting holes 36a-f may include a non-symmetrical, and reversible, mounting hole pattern. The depicted non-symmetrical and reversible mounting hole pattern may, for example, allow the starting system to be mounted in more than one position relative to the engine. For example, consistent with the illustrated embodiment, the starting system 10c may be mounted either forward or aft of the piston(s) of the engine. As such, the starting system may be mounted in different configurations depending upon the layout of the engine, the tool to be driven by the engine, any housing, chassis, controls, or the like, associated with the engine, the tool, or the piece of power equipment overall. For example, the starting system may be oriented such that the electric motor does not obstruct or interfere with the tool that is to be mounted to (e.g., an driven by) the engine. It will be appreciated that other embodiments may be implemented in which the bolt pattern accommodates only single mounting configuration of the starting system, and/or in which the bolt pattern accommodates multiple mounting configurations of the starting system (e.g., which may differ from the depicted embodiment).

Figure 25:
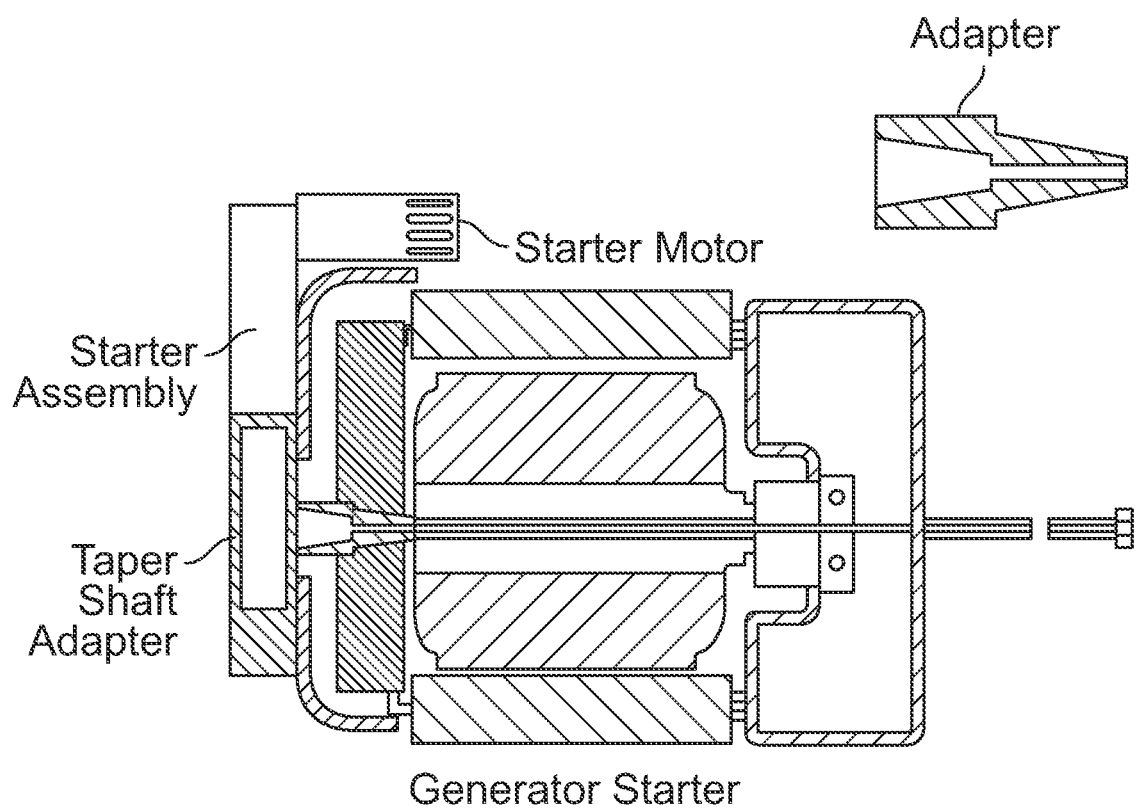
FIG. 25 is a diagrammatic depiction of an illustrative example embodiment of an electric starting system used in conjunction with a generator and an illustrative example embodiment of a shaft adapter that may be used in conjunction with the electric starting system, according to one example embodiment.
Figure 26:
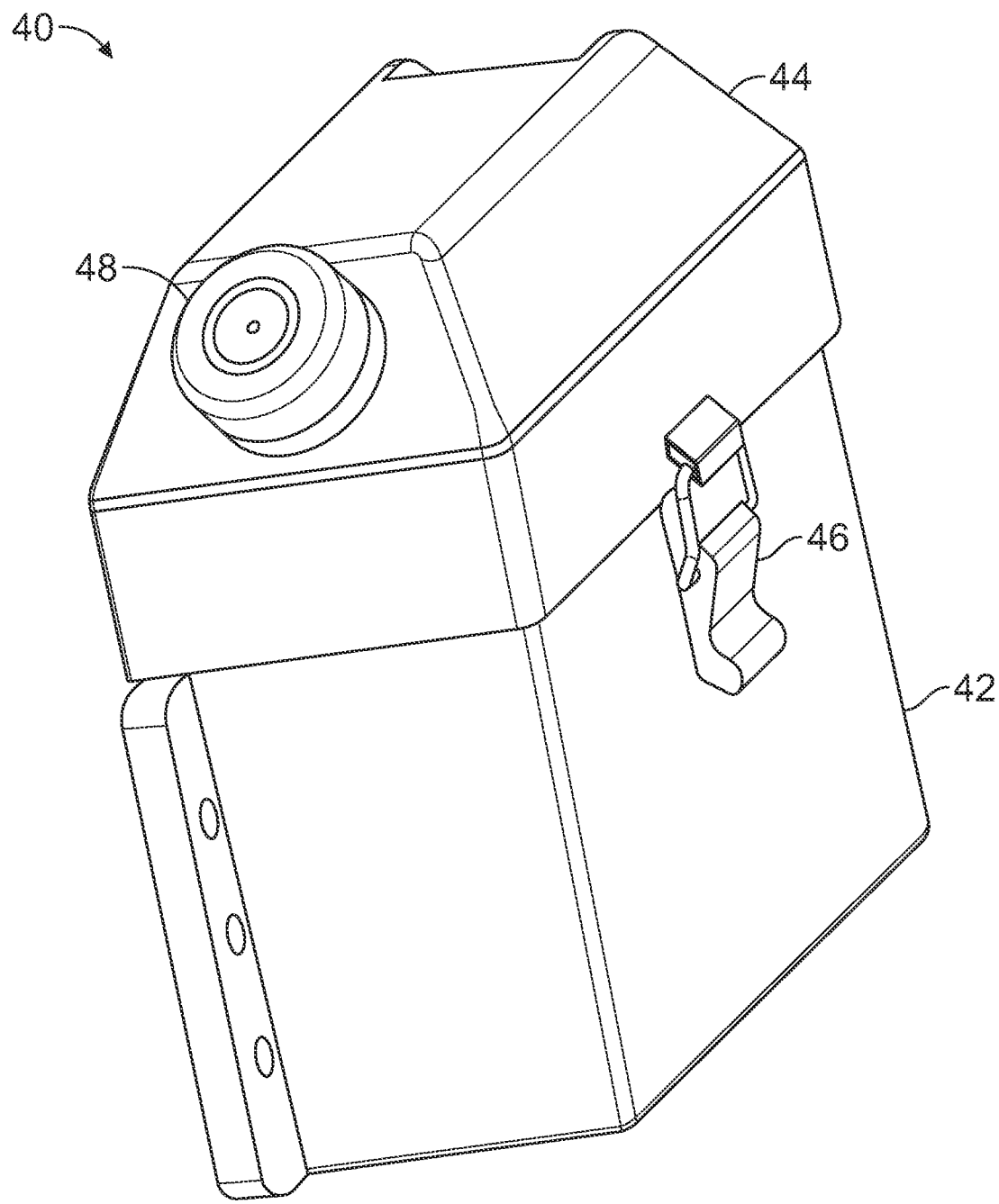
FIG. 26 is an illustrative example embodiment of a battery box assembly having a push button starter, according to one example embodiment.
Figure 27:
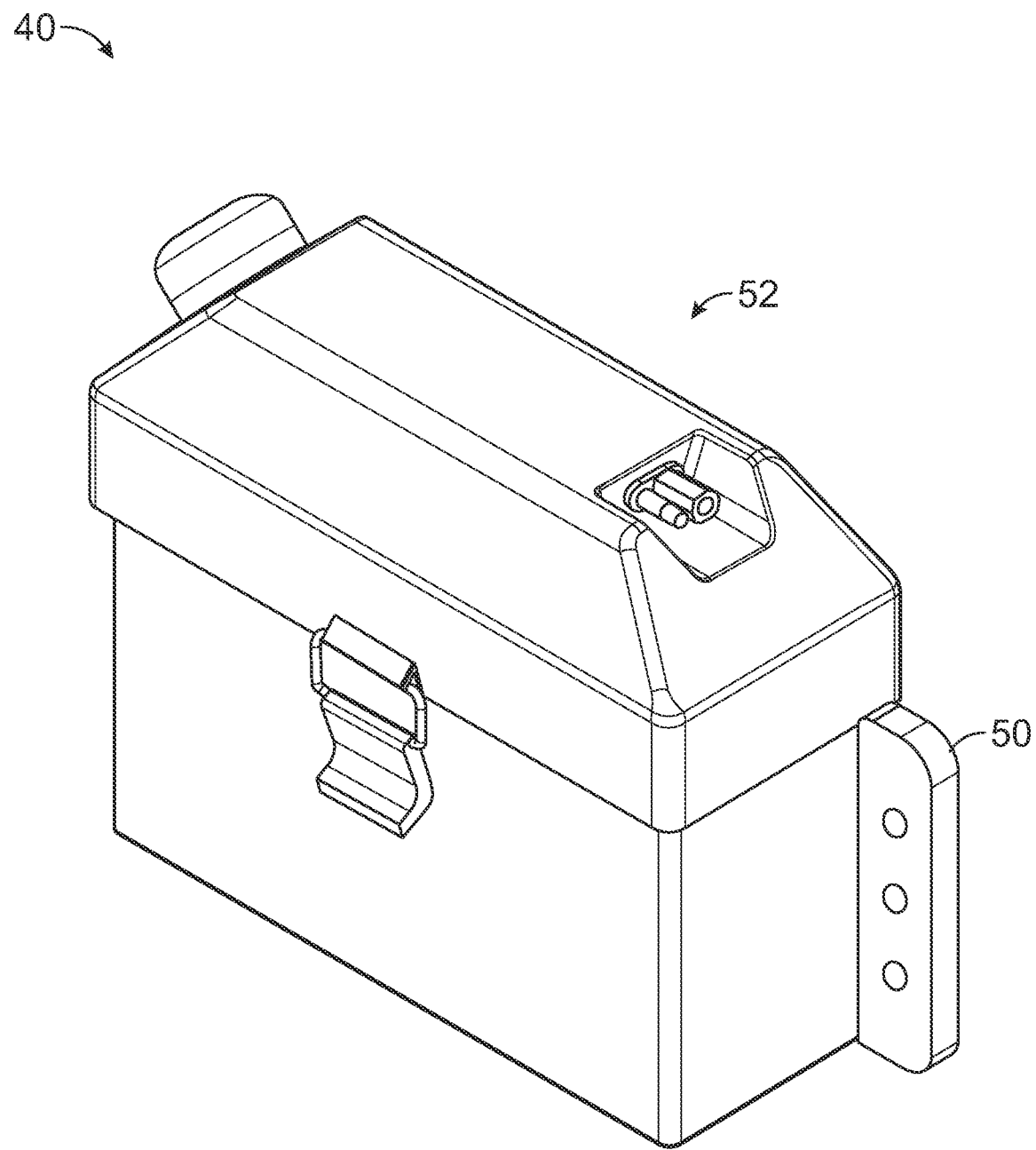
FIG. 27 is another view of the battery box assembly of FIG. 26, according to one example embodiment.
Figure 28:
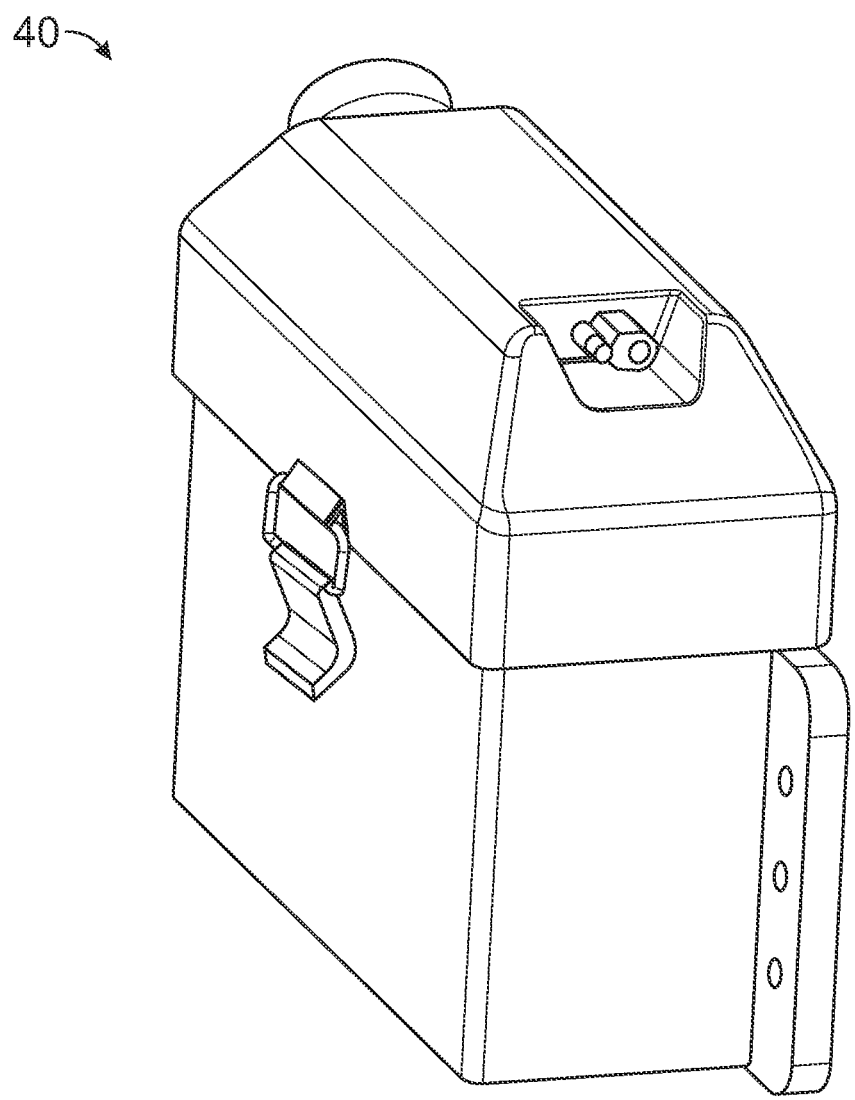
FIG. 28 is another view of the battery box assembly of FIG. 26, according to one example embodiment.
Figure 29:
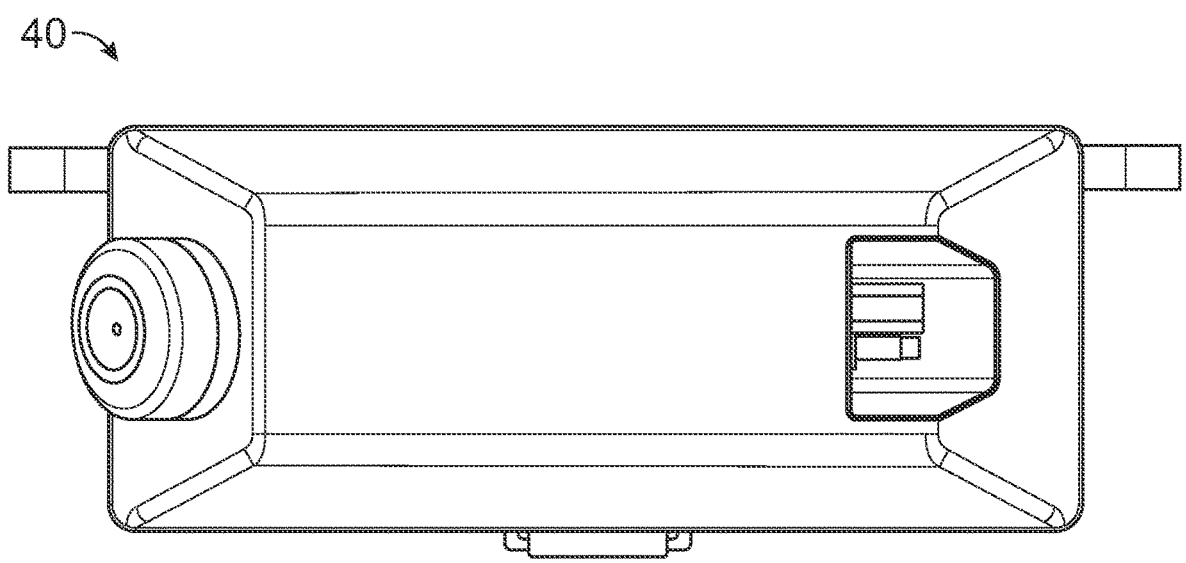
FIG. 29 is a top view of the battery box assembly of FIG. 26, according to one example embodiment.

In some instances, engines may be configured for particular applications. In some such instances, an engine may be provided in which the PTO may have a particular configuration (e.g., rather than a common keyed-cylindrical shaft configuration). For example, some portable generator configurations may utilize an at least partially tapered PTO, e.g., which may be received in a cooperating tapered input shaft of the portable generator alternator. In some embodiments, a starting system may be provided in which, for example, the one way bearing may be configured to engage the tapered PTO shaft and/or to engage at least a portion of the input shaft of the portable generator alternator. In some embodiments, and with particular reference to FIG. 25, an adapter may be provided, e.g., which may facilitate use of a starting system with a portable generator. For example, the adapter may include a member having a tapered opening, e.g., which may be configured to receive at least a portion of the tapered PTO of the engine and to allow rotational motion, or force, to be transmitted between the adapter and the PTO. Further, as shown, the adapter may include a tapered protrusion, e.g., which may generally correspond in taper, diameter, etc., to the tapered PTO. The tapered protrusion may, for example, be configured to be at least partially received by the input shaft of the portable generator alternator (e.g., to allow rotational motion, or force, to be transmitted between the adapter and the input shaft of the portable generator alternator). Consistent with such a configuration, the adapter may allow rotational motion, or force, to be transmitted from the PTO to the input shaft of the portable generator alternator via the adapter. Further, in an embodiment, the adapter may be configured to be rotationally engaged by a starting system consistent with the present disclose. For example, in one embodiment, at least a portion of the exterior of the adapter may be configured to be rotationally engaged by a one way bearing of a starting system. In one particular embodiment, the adapter may include a generally cylindrical portion of the exterior thereof, e.g., which may be keyed, splined, or the like, to facilitate transmission of rotational force from the driven element of the starting system to the adapter (and through the adapter to the engine for the purpose of starting the engine). It will be appreciated that other adapter configurations may be implemented, which may allow rotational force to be transmitted from the driven element of the starting system to the adapter (and through the adapter to the engine for the purpose of starting the engine).

Consistent with aspects of some embodiments of the disclosure, the starting system may be configured as a generally self-contained assembly, or module, that may provide electric starting capabilities for an engine. In some implementations, the starting system may be sandwiched between the engine and a tool to be driven by the engine. Further, while the starting system may provide electric starting capabilities for the engine, the engine may also include other starting arrangements (such as recoil starting arrangements, or the like). In such implementations, the engine may be electrically started using a starting system herein and/or may be started using other included starting arrangements (e.g., which may allow starting of the engine without using the starting system, such as when no sufficiently charged battery is available for energizing the electric motor of the starting system, and/or based on user preference).

Referring to FIGS. 26 through 31, according to some aspects, a battery box assembly 40 may be provided. The battery box assembly 40 may generally include a housing 42 and a lid 44, defining an interior for containing a battery. In some implementations, the housing 42 and the lid 44 may generally provide a container that may provide at least some degree of environmental and/or weather resistance for a battery contained in the battery box assembly 40. The battery box assembly 40 may be formed from any suitable material (e.g., plastic—reinforced or non-reinforced, metal, combinations of materials, etc.). Consistent with the illustrated embodiment, the housing 42 may be releasably coupled to the lid 44 using a suitable retention arrangement, such as a cam-style clasp 46. It will be appreciated that other retention arrangements may also suitably be utilized. Further, as desired, various seals may be included for improving environmental and/or weather resistance of the battery box assembly. Further, in some embodiments, the battery box assembly 20 may include one or more features that may facilitate mounting the battery box assembly to an engine, a tool (e.g., which may be driven by the engine), a starting system, a chassis or housing (e.g., of a piece of power equipment), or the like. For example, as shown, the battery box assembly may include one or more mounting flanges 50, that may facilitate mounting the battery box. It will be appreciated that other mounting configurations may equally be utilized.

In some embodiments, the battery box assembly 40 may be configured to contain a battery, e.g., which may be utilized to energize the electric motor of a starter system (e.g., one or more of starter systems 10a-c, and/or another starter system), which may, for example, be utilized for starting an engine. In one particular embodiment, as shown, the battery box assembly 40 may include a starting switch 48, e.g., which may be actuated to effectuate starting of the engine (e.g., by energizing the motor of a starting system). The starting switch 48 may include any suitable switch that may be utilized for energizing a starting system, such as, but not limited to, a push button switch, a key switch, a momentary on switch, or the like.

In some embodiments, the battery box assembly 40 may also include an electrical connector (e.g., electrical connector 52). The electrical connector 52 may allow a battery housed within the battery box assembly to be electrically connected to a battery charger, a starting system, or other components which may draw power from the battery and/or provide power to the battery (e.g., for charging and/or maintaining a charge of the battery). In some embodiments, the electrical connector 52 may allow the battery to be alternatively connected to either a battery charger (e.g., for charging and/or maintaining the battery) or a starting system (or other components which may draw power from the battery). For example, a suitable mating connector of a battery charger may be connected to the electrical connector 52 to effectuate charging (or maintaining) the battery. When the piece of power equipment is intended to be used a suitable mating connector of a starting system may be connected to the electrical connector (after first disconnecting a mating connector of a battery charger, if necessary). In an example embodiment, the electrical connector 52 may include a conventional two-pin SAE connector, however, any other suitable connector may also be utilized. Further, which the electrical connector 52 is generally shown as being retained by, and/or integrated into, the lid 44, it will be appreciated that the electrically connector could similarly be retained by, and/or integrated into, the housing 42. Further, in some embodiments, the electrical connector may be associated with a pigtail, e.g., which may extend from the battery box assembly 40.

Figure 30:
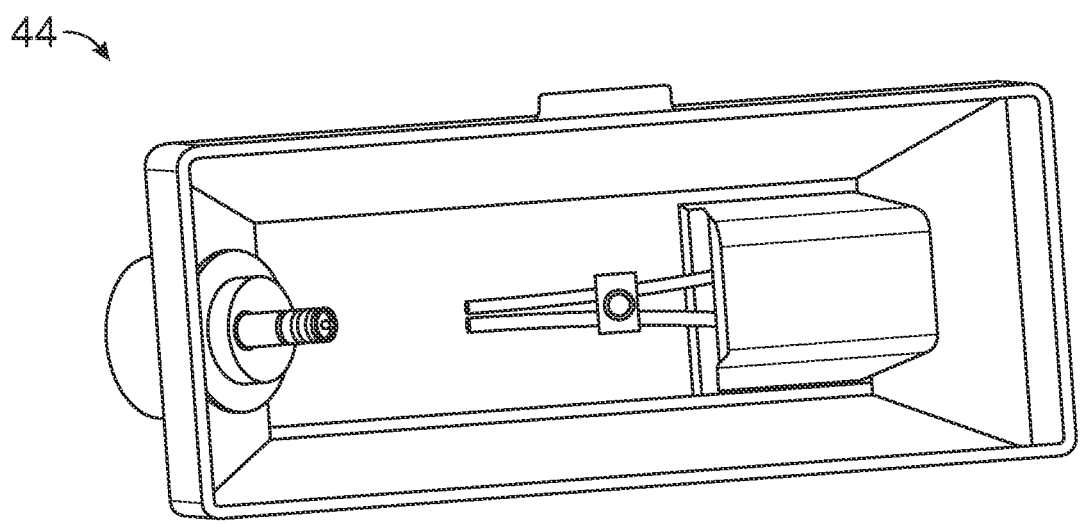
FIG. 30 depicts an inside of a lid portion of the battery box assembly of FIG. 26, according to one example embodiment.

As partially shown, e.g., in FIG. 30, one or more electrical leads may be disposed within the battery box assembly 40. For example, the one or more electrical leads may provide electrical connection between the electrical connector 52 and the battery. Similarly, the one or more electrical leads may provide electrical connection between the starting switch 46 and the battery. Further, in some embodiments, the one or more electrical leads may provide electrical connections between the battery, the electrical connector 52, and the starting switch 46. Additional electronic components may also be included.

Figure 31:
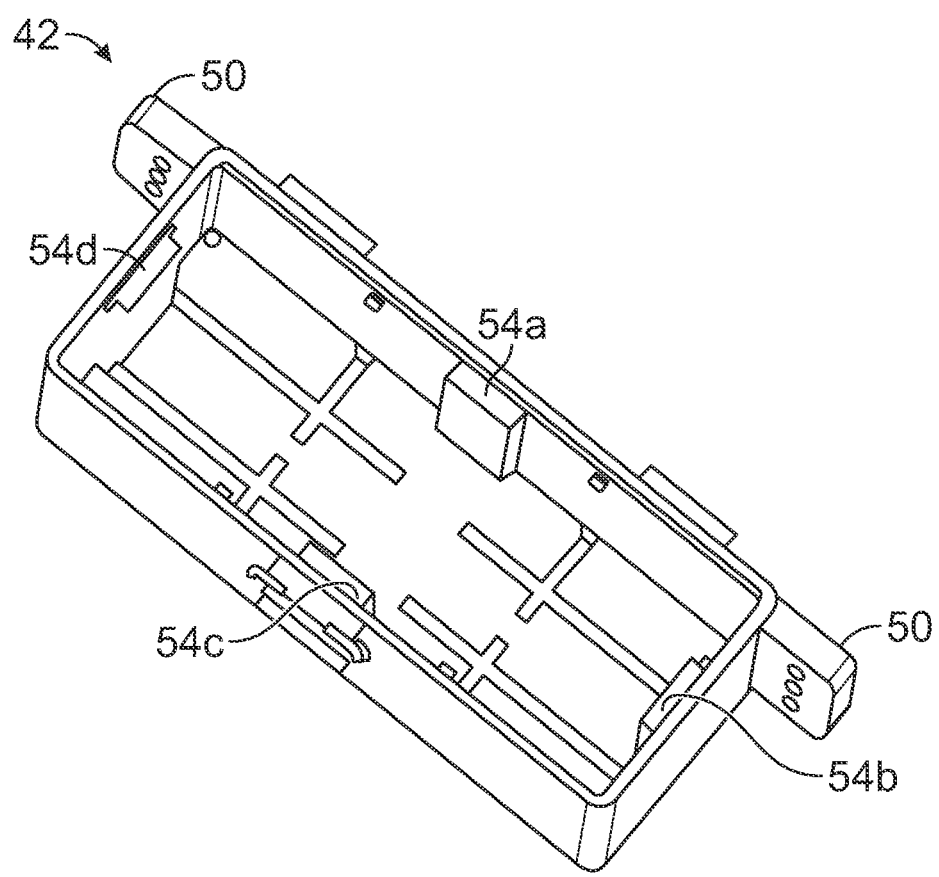
FIG. 31 is a perspective view showing an inside of a body portion of the battery box assembly of FIG. 26, according to one example embodiment.

With particular reference to FIG. 31, in some embodiments, the battery box assembly 40 may include one or more features that may, for example, facilitate retaining the battery and/or may mitigate physical stresses placed on the battery. For example, as shown, the battery box assembly may include one or more elastomeric features (e.g., elastomeric features 54a-d), which may provide some degree of vibration dampening for the battery. As such, vibration transmitted to the battery box assembly 40 (e.g., as the result of the operation of an engine) may be at least partially dampened by the elastomeric features, e.g., to thereby reduce the vibration experienced by the battery. Any suitable elastomeric material may be utilized, including, but not limited to, rubber, neoprene, silicone, urethane, etc.

Referring to FIGS. 32A-32D and 33A-33D, illustrative example electrical configurations that may be used in connection with a battery box assembly and/or a starting system are shown. Consistent with the illustrated embodiments, electrical connections between a charging source, a starting system and a battery may be provided. For example, and referring to FIGS. 32A-32D, in an embodiment a common electrical connector may be utilized both for charging a battery and for providing power to a starting system. For example, when a charging source is connected to the electrical connector, the charging source may charge the battery. When the electrical connector is connected to a starting system, the battery may be used to energize the starting system (e.g., energize an electric motor of the starting system) when the momentary switch (or other suitable starting switch) is actuated. Consistent with the illustrated example embodiment, a diode may be connected between terminals of the switch. Accordingly, when the electrical connector is connected to a charging source, charging current may pass through the diode (effectively bypassing the switch) to effectuate charging of the battery. By contrast, when the electrical connector is connected to a starting system, the diode may be prevent the flow of current. As such, current may not bypass the switch, but rather, may only be permitted to flow to the starting system when the switch is actuated.

Referring to FIGS. 33A-33D, in another embodiment, a separate charging connector (e.g., a charging jack) may be provided. Consistent with the illustrated embodiment, the charging pathway may be at least partially discrete, and separate, from the starting pathway. As such, when a charger is connected to the separate charging connector, the charging current may not need to bypass the starting switch. It will be appreciated that other configurations may equally be implemented.

While various illustrative example embodiments have been described herein, including particular features and combinations of features, it will be appreciated that implementations may be provided consistent with the present disclosure that incorporate various combinations of elements and features described across the various illustrative example embodiments, and/or that may incorporate additional and/or alternative elements and features and/or combinations of elements and features. As such the described illustrative example embodiments should be understood as describing possible features, objectives, and advantages of the present disclosure, and are intended for illustrative purposes only. Further, the elements, features, and concepts of the present disclosure are susceptible to modification and variation, as will be appreciated by those having skill in the art. As such, the scope of the present invention should not be construed as limited to any of the described embodiments.

What is claimed is:

1. An electric starting system comprising:
a self-contained housing configured to be mounted between an engine and a tool driven by the engine, wherein the housing is configured to be at least partially sandwiched between a mounting flange of the engine and one or more of a mounting flange of the tool and a mounting surface of the tool, the one or more of the mounting flange of the tool and the mounting surface of the tool being configured for direct mounting to the mounting flange of the engine, wherein the one or more of the mounting flange of the tool and the mounting surface of the tool include a plurality of mounting holes corresponding to a plurality of mounting holes of the mounting flange of the engine configured for directly mounting the tool to the engine, and wherein the housing includes a plurality of mounting holes corresponding to the mounting holes of the mounting flange of the engine and the mounting holes of the one or more of a mounting flange of the toll and the mounting surface of the tool, and wherein the housing includes a least a first housing portion and a second housing portion defining a drivetrain cavity, the first housing portion and the second housing portion enclosing a starting system drivetrain within the drivetrain cavity, and wherein the housing includes an opening extending there through allowing the engine and the tool to be rotationally coupled; and
an electric motor mounted to the housing, the electric motor configured rotationally engage an output shaft of the engine to effectuate starting of the engine.

2. The electric starting system according to claim 1, wherein the tool is mounted to the engine via the housing.

3. The electric starting system according to claim 1, further comprising a plurality of compression tubes respectively associated with each of the plurality of mounting holes to transmit compressive mounting forces between the mounting flange and the tool.

4. The electric starting system according to claim 1, wherein the housing includes two or more sets of holes corresponding to two or more different mounting flange hole patterns.

5. The electric starting system according to claim 1, wherein the electric motor is configured to one or more of:
directly rotationally engage the output shaft of the engine; and
rotationally engage an input shaft of the tool that is rotationally coupled with the output shaft of the engine.

6. The electric starting system according to claim 1, wherein the output shaft of the engine includes one or more of a power take-off (PTO) shaft of the engine and a crank shaft of the engine.

7. The electric starting system according to claim 1, wherein the electric motor is configured to directly rotationally engage the output shaft of the engine.

8. The electric starting system according to claim 1, wherein the drivetrain is configured to transmit rotational motion from the electric motor to the output shaft of the engine.

9. The electric starting system according to claim 8, wherein the drivetrain includes one or more of a gear-based drivetrain, a belt-based drivetrain, and a chain-based drivetrain.

10. The electric starting system according to claim 8, wherein the drivetrain includes a driven element providing selective rotational engagement between the electric motor and the output shaft of the engine.

11. The electric starting system according to claim 8, wherein the drivetrain includes a driven element having a floating center of axis.

12. The electric starting system according to claim 8, wherein:
the drivetrain includes an adapter including a first end defining a tapered opening for receiving at least a portion of the output shaft of the engine and a second, generally opposed, end defining a tapered protrusion for engaging an input of the tool, the adapter configured to rotationally couple the output shaft of the engine and the input of the tool; and
wherein the adapter is configured to be rotationally driven by the electric motor to effectuate starting of the engine.

13. The electric starting system according to claim 1, further comprising:
a battery box configured contain a battery capable of energizing the electric motor;
wherein the battery box further includes a switch for selectively energizing the electric motor; and
wherein the battery box further includes an electrical connector for electrically coupling the battery with the electric motor.

14. The electric starting system according to claim 13, wherein the battery box is configured to be mounted to one or more of the engine and the tool.

15. The electric starting system according to claim 13, wherein the electrical connector is further configured for coupling the battery with an external battery charger.

16. The electric starting system according to claim 15, further comprising a bypass, configured to allow current from the external battery charger to bypass the switch during charging of the battery.

17. A system comprising:
an engine;
a tool driven by the engine; and
a starting system including:

a housing at least partially sandwiched between a mounting flange of the engine and one or more of a mounting flange of the tool and a mounting surface of the tool via corresponding mounting holes in each of the housing, the mounting flange of the engine and one or more of the mounting flange of the tool and the mounting surface of the tool, wherein the one or more of the mounting flange of the tool and the mounting surface of the tool are configured for direct mounting to the mounting flange of the engine, and wherein the housing includes a least a first housing portion and a second housing portion defining a drivetrain cavity, the first housing portion and the second housing portion enclosing a starting system drivetrain within the drivetrain cavity, and wherein the housing includes an opening extending there through allowing the engine and the tool to be rotationally coupled;

a driven element at least partially disposed within the housing and rotationally coupleable with one or more of an output shaft of the engine and an input shaft of the tool via the opening extending through the housing; and an electric motor associated with the housing, and configured to be energized to rotationally drive the driven element to start the engine.

18. The system according to claim 17, wherein the starting system includes:

the drivetrain configured to transmit rotational motion from the electric motor to the driven element; and an overrunning clutch configured to provide selective rotational engagement between at least a portion of the starting system and one or more of the output shaft of the engine and the input shaft of the tool.

* * * * *